US011790723B2

(12) United States Patent
Taylor et al.

(10) Patent No.: US 11,790,723 B2
(45) **Date of Patent: *Oct. 17, 2023**

(54) ELECTRONIC GAMING MACHINE WITH DYNAMIC DISPLAY

(71) Applicant: Aristocrat Technologies Australia Pty Limited, North Ryde (AU)

(72) Inventors: Eric F. Taylor, Carson City, NV (US); Eric P. Winston, Reno, NV (US); Timothy William Seckel, Streamwood, IL (US); Steven M. Santisi, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,571

(22) Filed: Feb. 17, 2022

(65) Prior Publication Data

US 2022/0172557 A1 Jun. 2, 2022

Related U.S. Application Data

(63) Continuation of application No. 16/855,975, filed on Apr. 22, 2020, now Pat. No. 11,270,550, which is a continuation of application No. 16/177,248, filed on Oct. 31, 2018, now Pat. No. 10,713,880.

(60) Provisional application No. 62/733,058, filed on Sep. 18, 2018.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| *G07F 17/34* | (2006.01) |
| *G06Q 50/34* | (2012.01) |

(52) U.S. Cl.

CPC ...... *G07F 17/3211* (2013.01); *G07F 17/3209* (2013.01); *G07F 17/3223* (2013.01); *G07F 17/3267* (2013.01); *G07F 17/34* (2013.01); *G06Q 50/34* (2013.01); *G07F 17/3258* (2013.01)

(58) Field of Classification Search

CPC .............................. G07F 17/32; G07F 17/3214
USPC ........................ 463/1, 20, 22, 25, 31, 39, 40
See application file for complete search history.

(56) References Cited

U.S. PATENT DOCUMENTS 3,752,196 A 8/1973 Mayeur
5,717,423 A 2/1998 Parker
5,793,918 A 8/1998 Hogan
(Continued)

OTHER PUBLICATIONS

Notice of Allowance dated Feb. 24, 2020 for U.S. Appl. No. 16/177,248 (pp. 1-7).
(Continued)

*Primary Examiner* — Adetokunbo O Torimiro
(74) *Attorney, Agent, or Firm* — Weaver Austin Villeneuve & Sampson LLP

(57) ABSTRACT

Gaming systems, methods, and machines provided herein may include dynamic displays in which one or more first display panels are arranged around an opening to provide a display frame, and a plurality of second display panels, each part of a different movable display unit, are arranged within the opening. A plurality of linear drive mechanisms may be configured to cause the movable display units to translate inward and outward relative to the display frame.

20 Claims, 29 Drawing Sheets

(56) References Cited

U.S. PATENT DOCUMENTS

| | | | |
|---|---|---|---|
| 5,848,932 | A | 12/1998 | Adams |
| 6,189,246 | B1 | 2/2001 | Gorthala |
| 6,880,826 | B2 | 4/2005 | Inoue |
| 6,940,209 | B2 | 9/2005 | Henderson |
| 7,019,898 | B2 | 3/2006 | Page |
| 7,331,858 | B2 | 2/2008 | McComb |
| 7,510,476 | B2 | 3/2009 | Kobayashi |
| 7,514,132 | B2 | 4/2009 | Aida |
| 8,216,051 | B2 | 7/2012 | Rasmussen |
| 8,485,881 | B2 | 7/2013 | Griswold |
| 8,552,883 | B1 | 10/2013 | Su |
| 8,956,216 | B1 | 2/2015 | Lesourd |
| 8,979,636 | B2 | 3/2015 | Brooks |
| 9,269,283 | B2 | 2/2016 | Jurewicz |
| 10,208,934 | B2 | 2/2019 | Jurewicz |
| 2003/0060271 | A1 | 3/2003 | Gilmore |
| 2004/0209692 | A1 | 10/2004 | Schober |
| 2007/0099693 | A1 | 5/2007 | Nakashima |
| 2007/0293293 | A1 | 12/2007 | Baerlocher |
| 2011/0235332 | A1 | 9/2011 | Cheung |
| 2014/0259824 | A1 | 9/2014 | Jurewicz |

OTHER PUBLICATIONS

Notice of Allowance dated Oct. 5, 2020 for U.S. Appl. No. 16/213,830 (pp. 1-5).

Office Action (Notice of Allowance and Fees Due (PTOL-85)) dated Nov. 4, 2021 for U.S. Appl. No. 16/855,975 (pp. 1-5).

Office Action dated Apr. 24, 2020 for U.S. Appl. No. 16/213,830 (pp. 1-12).

Office Action dated Jun. 10, 2021 for U.S. Appl. No. 16/855,975 (pp. 1-5).

Office Action dated Nov. 8, 2019 for U.S. Appl. No. 16/177,248 (pagess 1-10).

U.S. Appl. No. 16/213,830, filed Dec. 7, 2018, Winston.

Office Action (Non-Final Rejection) dated Jan. 11, 2022 for U.S. Appl. No. 17/247,420 (pp. 1-6).

Office Action (Notice of Allowance and Fees Due (PTOL-85)) dated Jun. 6, 2022 for U.S. Appl. No. 17/247,420 (pp. 1-5).

Office Action dated Aug. 11, 2022 for U.S. Appl. No. 17/449,635 (pp. 1-17).

Office Action (Final Rejection) dated Dec. 7, 2022 for U.S. Appl. No. 17/449,635 (pp. 1-15).

ELECTRONIC GAMING MACHINE WITH DYNAMIC DISPLAY

CROSS-REFERENCE TO RELATED APPLICATIONS

This application is a continuation under 35 U.S.C. § 120 of U.S. patent application Ser. No. 16/855,975, filed Apr. 22, 2020, and titled "ELECTRONIC GAMING MACHINE WITH DYNAMIC DISPLAY," which itself is a continuation under 35 U.S.C. § 120 of U.S. patent application Ser. No. 16/177,248, filed Oct. 31, 2018, and titled "ELECTRONIC GAMING MACHINE WITH DYNAMIC DISPLAY," which itself claims benefit of priority under 35 U.S.C. § 119(e) to U.S. Provisional Application No. 62/733,058, filed Sep. 18, 2018, titled "ELECTRONIC GAMING MACHINE WITH DYNAMIC DISPLAY," all of which are hereby incorporated herein by reference in their entireties and for all purposes.

BACKGROUND

The field of disclosure relates generally to electronic gaming, and more particularly to systems and methods relating to play of an electronic game on a gaming machine having a dynamic display.

Electronic gaming machines ("EGMs"), also referred to herein simply as gaming machines, or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

As alluded to earlier herein, some gaming machines are configured to present a bonus game in response to the occurrence of a bonus condition or bonus trigger in a base, or primary, game. Specifically, a player may qualify for a bonus game based upon one or more base game outcomes. A bonus game may be played in accordance with rules that are different from the rules of the base game, and prizes or awards generated during the bonus game may be different from prizes and awards generated during the base game.

SUMMARY

In some implementations, an electronic gaming system may be provided that includes a housing, a display frame including one or more first display panels encircling an opening, a plurality of movable display units arranged in an array within the opening, each movable display unit including a second display panel, and a plurality of linear drive mechanisms, each linear drive mechanism connected with one of the movable display units and configured to translate the movable display unit connected therewith relative to the housing and along a first axis responsive to receipt of a control signal. The electronic gaming system may also include a game controller that includes one or more processors and one or more memory devices. In such an electronic gaming system, the one or more first display panels may define a nominal display plane, the one or more first display panels may be fixed in space relative to the housing, the first axes may be perpendicular to the nominal display plane, the second display panels may be parallel to the nominal display plane, the one or more processors, the one or more memory devices, the one or more first display panels, the second display panels, and the linear drive mechanisms may be operably connected, and the one or more memory devices may store computer-executable instructions for controlling the one or more processors to: present a wagering game using the one or more first display panels and the second display panels, and cause the linear drive mechanisms to be selectively actuated to cause the movable display units connected therewith to translate during presentation of the wagering game in association with an occurrence of one or more events during presentation of the wagering game.

In some implementations of the electronic gaming system, the wagering game may be a reel-based wagering game, and the one or more memory devices may further store additional computer-executable instructions for further controlling the one or more processors to: cause one or more of the movable display units to each display a reel stop for the reel-based wagering game during play of the wagering game, and cause the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict a winning outcome. Alternatively, the one or more memory devices may further store additional computer-executable instructions for further controlling the one or more processors to cause the linear drive mechanisms for the movable display units in the first subset of the movable display units to translate the movable the movable display units in the first subset of the movable display units to a displaced position relative to the nominal display plane when the reel stops displayed by the movable display units in a second subset of the movable display units depict a winning outcome.

In some implementations of the electronic gaming system, the wagering game may be a reel-based wagering game, and the one or more memory devices may further store additional computer-executable instructions for further controlling the one or more processors to cause one or more of the movable display units to each display a reel stop for the reel-based wagering game during play of the wagering game, and cause the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that are to remain unchanged for a successive play of the wagering game. Alternatively, the one or more memory devices may further store additional computer-executable instructions for further controlling the one or more processors to cause the linear drive mechanisms for the movable display units in a first subset of the movable display units to translate the movable display units in the first subset of the movable display units to a displaced position relative to the nominal display plane when the reel stops displayed by the movable display units in a second subset of the movable display units depict reel stops that are to remain unchanged for a successive play of the wagering game.

In some implementations of the electronic gaming system, the wagering game may be a reel-based wagering game, and the one or more memory devices may further store additional computer-executable instructions for further controlling the one or more processors to cause one or more of the movable display units to each display a reel stop for the reel-based wagering game during play of the wagering game, and cause the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that form a winning pattern for the wagering game. Alternatively, the one or more memory devices may further store additional computer-executable instructions for further controlling the one or more processors to cause the linear drive mechanisms for the movable display units in a first subset of the movable display units to translate the movable display units in the first subset of the movable display units to a displaced position relative to the nominal display plane when the reel stops displayed by the movable display units in a second subset of the movable display units depict reel stops that form a winning pattern for the wagering game.

In some implementations of the electronic gaming system, the movable display units may be arranged in a rectangular array within the opening, and the second display panel of each movable display unit may have four edges defining a rectangular shape when viewed along the corresponding first axis.

In some implementations of the electronic gaming system, each movable display unit may further include a cover glass and a touch-screen interface configured to receive touch input from a user. The cover glass and the touch-screen interface may, when viewed along the first axis, overlay one or more the movable display units and/or the display frame.

In some implementations of the electronic gaming system, each movable display unit may further include four side panels that are each perpendicular to the second display panel of the movable display unit and that each extend from a location proximate to a different one of the edges of the second display panel and towards the linear drive mechanism connected with that movable display unit, and one or more illumination devices configured to illuminate at least part of each side panel in response to receipt of an illumination control signal from the game controller.

In some implementations of the electronic gaming system, each movable display unit may further include four side panels that are each perpendicular to the second display panel of the movable display unit and that each extend from a location proximate to a different one of the edges of the second display panel and towards the linear drive mechanism connected with that movable display unit, and the side panels of each movable display unit may each include a third display panel that is operatively connected with the game controller and configured to present graphical content in response to receipt of instructions from the game controller.

In some implementations of the electronic gaming system, each movable display unit may further include four side panels and an actuation mechanism, each of the side panels may be movably mounted in the corresponding movable display unit and operatively connected with the actuation mechanism, each actuation mechanism may be configured to cause the side panels of the corresponding movable display unit to transition between a first configuration and a second configuration responsive to receipt of one or more control signals from the game controller, the side panels of each movable display unit, in the first configuration, may be positioned behind the second display panel of the corresponding movable display unit when viewed along the first axis with the linear drive mechanism of the corresponding movable display unit located behind the second display panel, and the side panels of each movable display unit, in the second configuration, may each be positioned such that a major surface of each side panel is positioned with an edge proximate to one of the edges of the second display of the corresponding movable display unit and such that the major surface is substantially parallel with the second display panel of the corresponding movable display unit.

In some implementations of the electronic gaming system, the side panels of each movable display unit may each include a third display panel that is operatively connected with the game controller and configured to present graphical content in response to receipt of instructions from the game controller.

In some implementations of the electronic gaming system, each movable display unit may further include: a rotational actuator that supports, directly or indirectly, the second display panel of the movable display unit with respect to the linear drive mechanism of the movable display unit, and the rotational actuator may be configured to rotate the second display panel directly or indirectly supported thereby about at least a second axis that is perpendicular to the first axis of the linear drive mechanism responsive to receipt of one or more signals from the game controller.

In some implementations of the electronic gaming system, each movable display unit may have a second display panel with a single pixel, and the linear drive mechanisms for edge-to-edge-adjacent movable display units may be positioned at different elevational offsets so that the linear drive mechanisms for such edge-to-edge-adjacent movable display units overlap one another when viewed along the first axis.

In some implementations, a method may be provided that includes: a) providing an electronic gaming system including: a housing, a display frame including one or more first display panels encircling an opening, a plurality of movable display units arranged in an array within the opening, each movable display unit including a second display panel, and a plurality of linear drive mechanisms, each linear drive mechanism connected with one of the movable display units and configured to translate the movable display unit connected therewith relative to the housing and along a first axis responsive to receipt of a control signal. In such an electronic gaming system, the one or more first display panels may define a nominal display plane, the one or more first display panels may be fixed in space relative to the housing, the first axes may be perpendicular to the nominal display plane, and the second display panels may be parallel to the nominal display plane. The method may further include b) presenting a wagering game using the one or more first display panels and the second display panels and c) causing the linear drive mechanisms to be selectively actuated to cause the movable display units connected therewith to translate relative to the display frame during presentation of the wagering game in association with an occurrence of one or more events during presentation of the wagering game.

In some implementations of the method, the wagering game may be a reel-based wagering game and the method may further include causing one or more of the movable display units to each display a reel stop for the reel-based wagering game during play of the wagering game, and causing the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict a winning outcome. Alternatively, the linear drive mechanisms for the movable display units in the first subset of the movable display units may be caused to translate the movable the movable display units in the first subset of the movable display units to a displaced position relative to the nominal display plane when the reel stops displayed by the movable display units in a second subset of the movable display units depict a winning outcome.

In some implementations of the method, the wagering game may be a reel-based wagering game and the method may further include causing one or more of the movable display units to each display a reel stop for the reel-based wagering game during play of the wagering game, and causing the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that are to remain unchanged for a successive play of the wagering game. Alternatively, the linear drive mechanisms for the movable display units in a first subset of the movable display units may be caused to translate the movable display units in the first subset of the movable display units to a displaced position relative to the nominal display plane when the reel stops displayed by the movable display units in a second subset of the movable display units depict reel stops that are to remain unchanged for a successive play of the wagering game In some implementations of the method, the wagering game may be a reel-based wagering game and the method may further include causing one or more of the movable display units to each display a reel stop for the reel-based wagering game during play of the wagering game, and causing the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that form a winning pattern for the wagering game. Alternatively, the linear drive mechanisms for the movable display units in a first subset of the movable display units to translate the movable display units in the first subset of the movable display units to a displaced position relative to the nominal display plane when the reel stops displayed by the movable display units in a second subset of the movable display units depict reel stops that form a winning pattern for the wagering game.

In some implementations of the method, the movable display units may be arranged in a rectangular array within the opening, and the second display panel of each movable display unit may have four edges defining a rectangular shape when viewed along the corresponding first axis. In some such implementations, each movable display unit further may include four side panels that are each perpendicular to the second display panel of the movable display unit and that each extend from a location proximate to a different one of the edges of the second display panel and towards the linear drive mechanism connected with that movable display unit, and one or more illumination devices configured to illuminate at least part of each side panel in response to receipt of an illumination control signal. In such implementations, the method may further include selectively activating one or more of the illumination devices by providing the corresponding illumination control signal in coordination with actuation of one or more of the linear drive mechanisms. In some other such implementations, each movable display unit may further include four side panels that are each perpendicular to the second display panel of the movable display unit and that each extend from a location proximate to a different one of the edges of the second display panel and towards the linear drive mechanism connected with that movable display unit, and the side panels of each movable display unit may each include a third display panel that is configured to present graphical content in response to receipt of instructions. In such implementations, the method may further include causing graphical content to be displayed on one or more of the third display panels in coordination with actuation of one or more of the linear drive mechanisms.

In some implementations of the method, each movable display unit may further include four side panels and an actuation mechanism, each of the side panels may be movably mounted in the corresponding movable display unit and operatively connected with the actuation mechanism, each actuation mechanism may be configured to cause the side panels of the corresponding movable display unit to transition between a first configuration and a second configuration responsive to receipt of one or more control signals, the side panels of each movable display unit, in the first configuration, may be positioned behind the second display panel of the corresponding movable display unit when viewed along the first axis with the linear drive mechanism of the corresponding movable display unit located behind the second display panel, and the side panels of each movable display unit, in the second configuration, may each be positioned such that a major surface of each side panel is positioned with an edge proximate to one of the edges of the second display of the corresponding movable display unit and such that the major surface is substantially parallel with the second display panel of the corresponding movable display unit. In such implementations, the method may further include causing, by providing at least some of the one or more control signals, one or more of the actuation mechanisms to cause the side panels of one or more of first movable display units of the movable display units to transition to the second configuration from the first configuration when the first movable display units are in an extended position. In some such implementations of the method, the side panels of each movable display unit may each include a third display panel, and the method may further include causing one or more of the third display panels to display graphical content in coordination with actuation of one or more of the linear drive mechanisms.

In some implementations of the method, each movable display unit may further include a rotational actuator that supports, directly or indirectly, the second display panel of the movable display unit with respect to the linear drive mechanism of the movable display unit. In such implementations, the rotational actuator may be configured to rotate the second display panel directly or indirectly supported thereby about at least a second axis that is perpendicular to the first axis of the linear drive mechanism, and the method may further include actuating one or more of the rotational actuators in coordination with actuation of one or more of the linear drive mechanisms.

In some implementations, a non-transitory, computer-readable storage device storing computer-executable instructions for controlling one or more processors of a gaming machine may be provided. Such a storage device may store computer-executable instructions for controlling the one or more processors of the gaming machine to: a) present a wagering game using one or more first display panels of the gaming machine that are part of a stationary display frame of the gaming machine and using a plurality of second display panels of the gaming machine, where the gaming machine includes a plurality of movable display units arranged in an array within an opening of the display panel and each movable display unit includes at least one of the second display panels, and b) cause linear drive mechanisms of the gaming machine that are each connected with one of the movable display units to be selectively actuated to cause the movable display units connected therewith to translate in a direction perpendicular to a nominal display plane defined by the one or more first display panels during presentation of the wagering game in association with an occurrence of one or more events during presentation of the wagering game.

In some implementations, the one or more first display panels may define a nominal display plane, the wagering game may be a reel-based wagering game, and the storage device may store computer-executable instructions for controlling the one or more processors of the gaming machine to: cause one or more of the movable display units to each display a reel stop for the reel-based wagering game during play of the wagering game, and cause the linear drive mechanisms connected with the movable display units in a first subset of the movable display units to translate the movable display units in the first subset of the movable display units to a displaced position relative to the nominal display plane when the reel stops displayed by the movable display units in the first subset of the movable display units depict a winning outcome. Alternatively, the storage device may store computer-executable instructions for controlling the one or more processors of the gaming machine to cause the linear drive mechanisms connected with the movable display units in a first subset of the movable display units to translate the movable display units in the first subset of the movable display units to a displaced position relative to the nominal display plane when the reel stops displayed by the movable display units in a second subset of the movable display units depict a winning outcome.

In some implementations, the one or more first display panels may define a nominal display plane, the wagering game may be a reel-based wagering game, and the storage device may store computer-executable instructions for controlling the one or more processors of the gaming machine to: cause one or more of the movable display units to each display a reel stop for the reel-based wagering game during play of the wagering game, and cause the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that are to remain unchanged for a successive play of the wagering game. Alternatively, the storage device may store computer-executable instructions for controlling the one or more processors of the gaming machine to cause the linear drive mechanisms for the movable display units in a first subset of the movable display units to translate the movable display units in the first subset of the movable display units to a displaced position relative to the nominal display plane when the reel stops displayed by the movable display units in a second subset of the movable display units depict reel stops that are to remain unchanged for a successive play of the wagering game.

In some implementations, the one or more first display panels may define a nominal display plane, the wagering game may be a reel-based wagering game, and the storage device may store computer-executable instructions for controlling the one or more processors of the gaming machine to: cause one or more of the movable display units to each display a reel stop for the reel-based wagering game during play of the wagering game, and cause the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that form a winning pattern for the wagering game. Alternatively, the storage device may store computer-executable instructions for controlling the one or more processors of the gaming machine to cause the linear drive mechanisms for the movable display units in a first subset of the movable display units to translate the movable display units in the first subset of the movable display units to a displaced position relative to the nominal display plane when the reel stops displayed by the movable display units in a second subset of the movable display units depict reel stops that form a winning pattern for the wagering game.

In some implementations of the non-transitory, computer-readable storage device, the computer-executable instructions stored thereon may be configured to work with an array of movable display units that are arranged in a rectangular array within the opening and with movable display units where the second display panel of each movable display unit has four edges defining a rectangular shape when viewed along the corresponding first axis.

In some implementations, each movable display unit may further include four side panels that are each perpendicular to the second display panel of the movable display unit and that each extend from a location proximate to a different one of the edges of the second display panel and towards the linear drive mechanism connected with that movable display unit, and one or more illumination devices configured to illuminate at least part of each side panel in response to receipt of an illumination control signal. In such implementations, the non-transitory computer-readable storage device may store further computer-executable instructions for further controlling one or more processors to selectively activate one or more of the illumination devices by providing a corresponding illumination control signal in coordination with actuation of one or more of the linear drive mechanisms.

In some implementations, each movable display unit may further include four side panels that are each perpendicular to the second display panel of the movable display unit and that each extend from a location proximate to a different one of the edges of the second display panel and towards the linear drive mechanism connected with that movable display unit, and the side panels of each movable display unit may each include a third display panel that is operatively connected with the one or more processors and configured to present graphical content in response to receipt of instructions from the one or more processors. In such implementations, the non-transitory computer-readable storage device may store further computer-executable instructions for further controlling one or more processors to cause graphical content to be displayed on one or more of the third display panels in coordination with actuation of one or more of the linear drive mechanisms.

In some implementations, each movable display unit may further include four side panels and an actuation mechanism, each of the side panels may be movably mounted in the corresponding movable display unit and operatively connected with the actuation mechanism, each actuation mechanism may be configured to cause the side panels of the corresponding movable display unit to transition between a first configuration and a second configuration responsive to receipt of one or more control signals from the one or more processors, the side panels of each movable display unit, in the first configuration, may be positioned behind the second display panel of the corresponding movable display unit when viewed along the first axis with the linear drive mechanism of the corresponding movable display unit located behind the second display panel, and the side panels of each movable display unit, in the second configuration, may each be positioned such that a major surface of each side panel is positioned with an edge proximate to one of the edges of the second display of the corresponding movable display unit and such that the major surface is substantially parallel with the second display panel of the corresponding movable display unit. In such implementations, the non-transitory computer-readable storage device may store further computer-executable instructions for further controlling one or more processors to cause one or more of the actuation mechanisms to cause the side panels of one or more of first movable display units of the movable display units to transition to the second configuration from the first configuration when the first movable display units are in an extended position.

In some such implementations, the side panels of each movable display unit may each include a third display panel and the non-transitory computer-readable storage device may store further computer-executable instructions for further controlling one or more processors to cause one or more of the third display panels to display graphical content in coordination with actuation of one or more of the linear drive mechanisms.

In some implementations, each movable display unit may further include a rotational actuator that supports, directly or indirectly, the second display panel of the movable display unit with respect to the linear drive mechanism of the movable display unit, and the rotational actuator may be configured to rotate the second display panel directly or indirectly supported thereby about at least a second axis that is perpendicular to the first axis of the linear drive mechanism. In such implementations, the non-transitory computer-readable storage device may store further computer-executable instructions for further controlling one or more processors to actuate one or more of the rotational actuators in coordination with actuation of one or more of the linear drive mechanisms.

These and other implementations will be evident from the discussion below, and the disclosure is not limited to the above-listed specific implementations.

BRIEF DESCRIPTION OF THE DRAWINGS

FIGS. 1 through 32 are intended to be illustrative only and should not be viewed as limiting this disclosure to only the depicted implementations. It is to be understood that the concepts discussed herein may be implemented in a vast number of different ways while still embodying the ideas discussed herein, and it is to be understood that this disclosure covers such alternative implementations.

DETAILED DESCRIPTION

Figure 1:
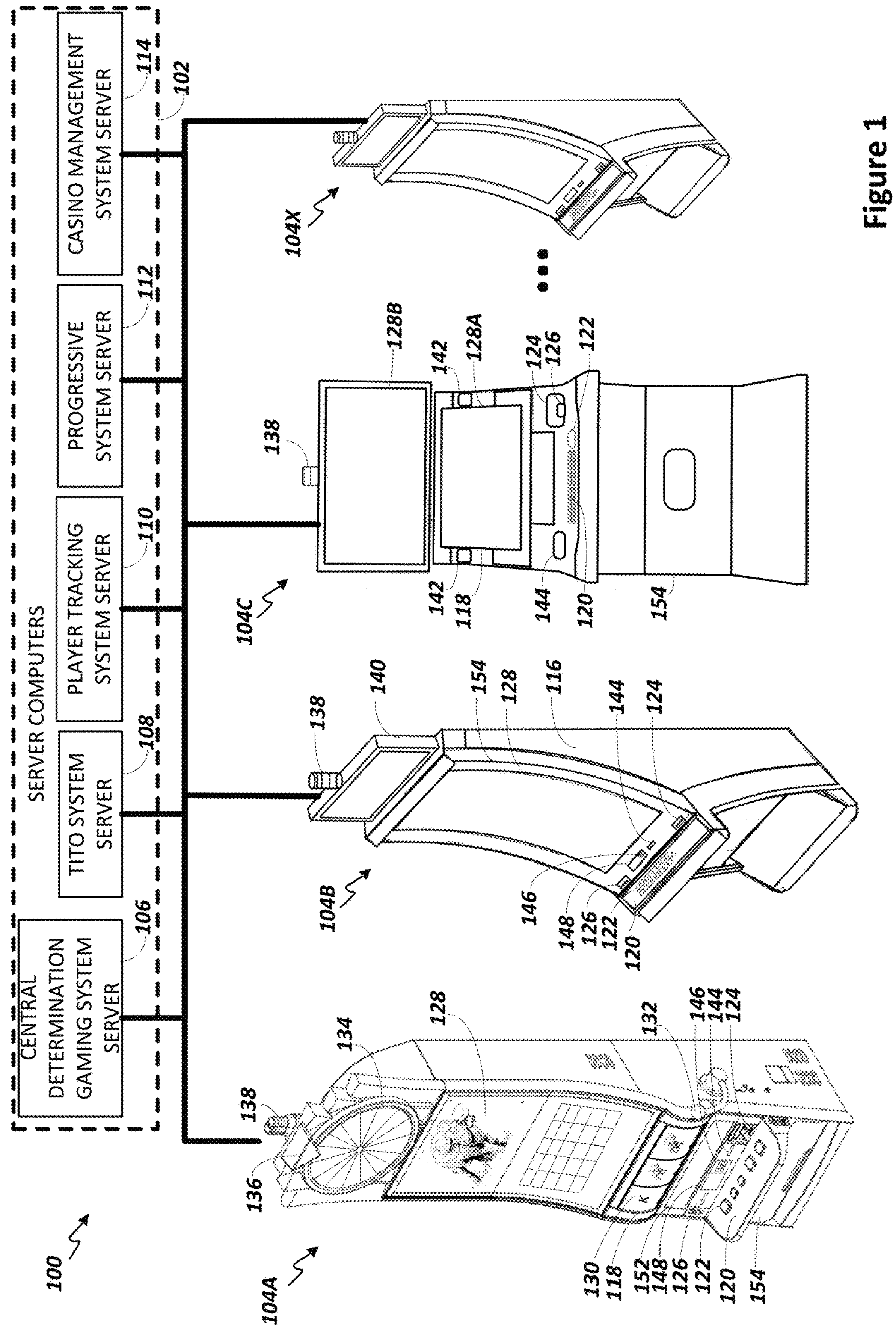
FIG. 1 is an exemplary diagram showing several EGMs networked with various gaming related servers.

The subject matter of the present disclosure relates to systems for and methods of providing electronic gaming, and more particularly, to systems including, and methods of using, dynamic displays in electronic gaming machines. In most modern gaming machines, wagering games are presented on flat or curvilinear-profile graphical displays that display graphical content depicting a game of chance in response to instructions received from a gaming controller. Discussed herein are new types of electronic gaming machines that include one or more dynamic displays. A dynamic display, as the term is used herein, refers to a display with an active display area that is composed of a plurality of movable areas surrounded by a static "display frame" that remains fixed in place. The display frame may be, for example, a rectangular shape with a rectangular opening in the middle, and may have one or more first display panels arranged to form the rectangular shape. The display frame may thus be used to display graphical content in a rectangular border area using the one or more first display panels (a single first display panel with the opening in the middle may be used, or, for example, four first display panels may be used, with each first display panel extending along a different edge of the rectangular opening.

A dynamic display may, as noted above, also include movable areas located within the opening. The movable areas may each correspond to a separate movable display unit that may independently be actuated so as to translate along a direction generally perpendicular to the nominal plane of the display frame. Each movable display unit may have its own corresponding second display panel. The movable display units discussed herein may, alternatively, be referred as mechanized display panels as well, if desired. The display panels discussed herein may, for example, be LCD, LED, microLED, OLED, or other types of suitable display panels.

Dynamic displays such as described herein may introduce a new and exciting user experience for players of electronic gaming machines, as the dynamic displays may not only provide graphical content, but may also feature physical movement of portions of the dynamic display to provide additional graphical effects and game play experiences. For example, graphical content may be displayed on the display panels of the movable display units and may be choreographed or coordinated with the movement (or non-movement) of such movable display units. Such movement and graphical content display may be part of game play, part of a celebration display, or part of an attract mode (e.g., when a gaming machine is not actively being played by a person, it may revert to displaying graphics and causing motion of the movable display units in a particular manner designed to attract a potential player).

Provided below is a general discussion of electronic gaming machines, followed by a more in-depth discussion of various implementations of dynamic displays and electronic gaming machines with dynamic displays.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other implementations, the gaming devices 104A-104X may communicate with one another and/or the server computers 102 over RF, cable TV, satellite links and the like.

In some implementations, server computers 102 may not be necessary and/or preferred. For example, the present invention may, in one or more implementations, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a Class II gaming bingo server (not shown), a ticket-in-ticket-out (TITO) system server 108, a player tracking system server 110, a progressive system server 112, and/or a casino management system server 114. Gaming devices 104A-104X (which may be generically referred to herein as "gaming device" or "gaming machine" 104) may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 including a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, microLED, or OLED panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some implementations, a player tracking card reader 144, a transceiver for wireless communication with a player's smartphone, a keypad 146, and/or an illuminated display 148 for reading, receiving, entering, and/or displaying player tracking information is provided in EGM 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2:
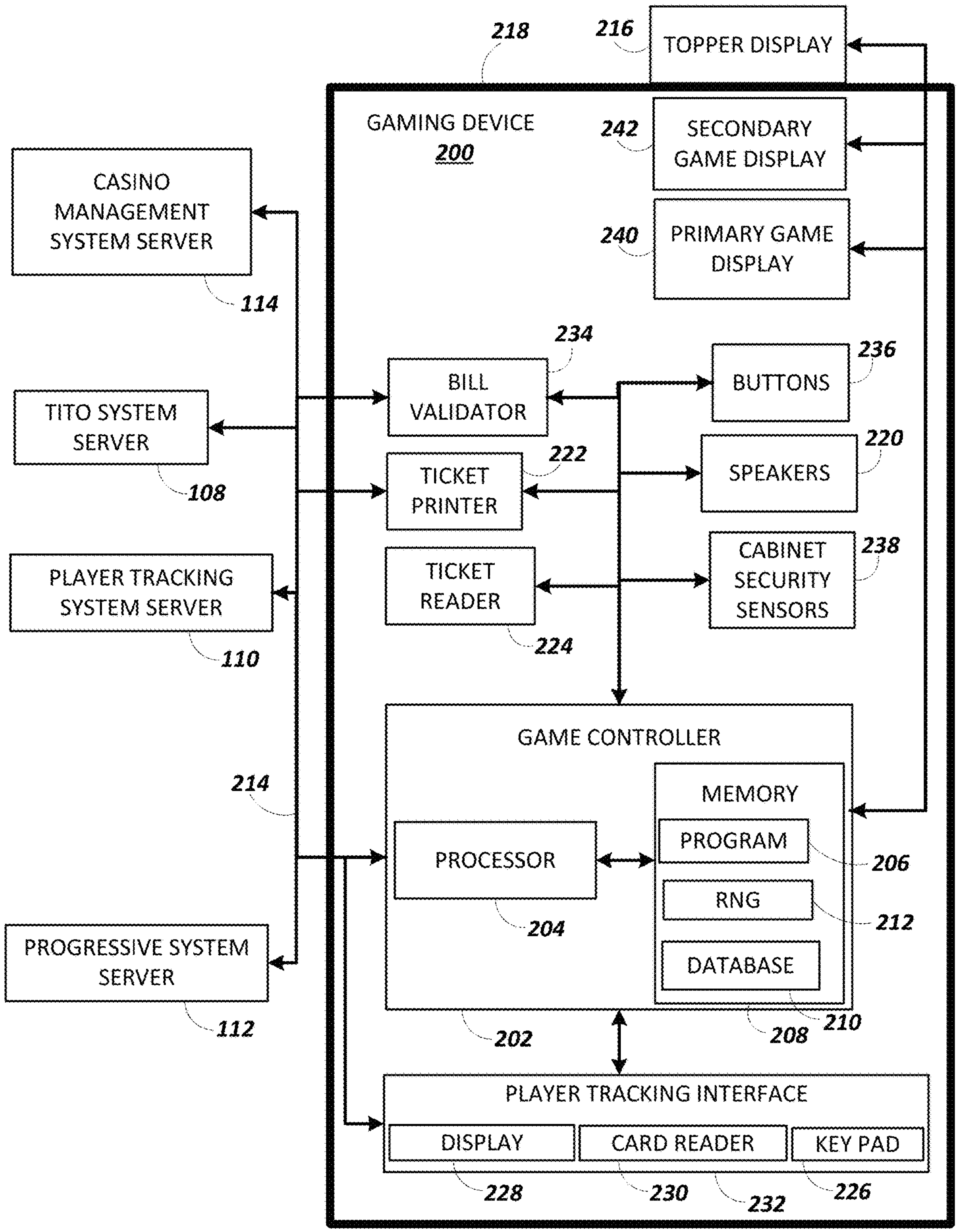
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing implementations of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some implementations, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
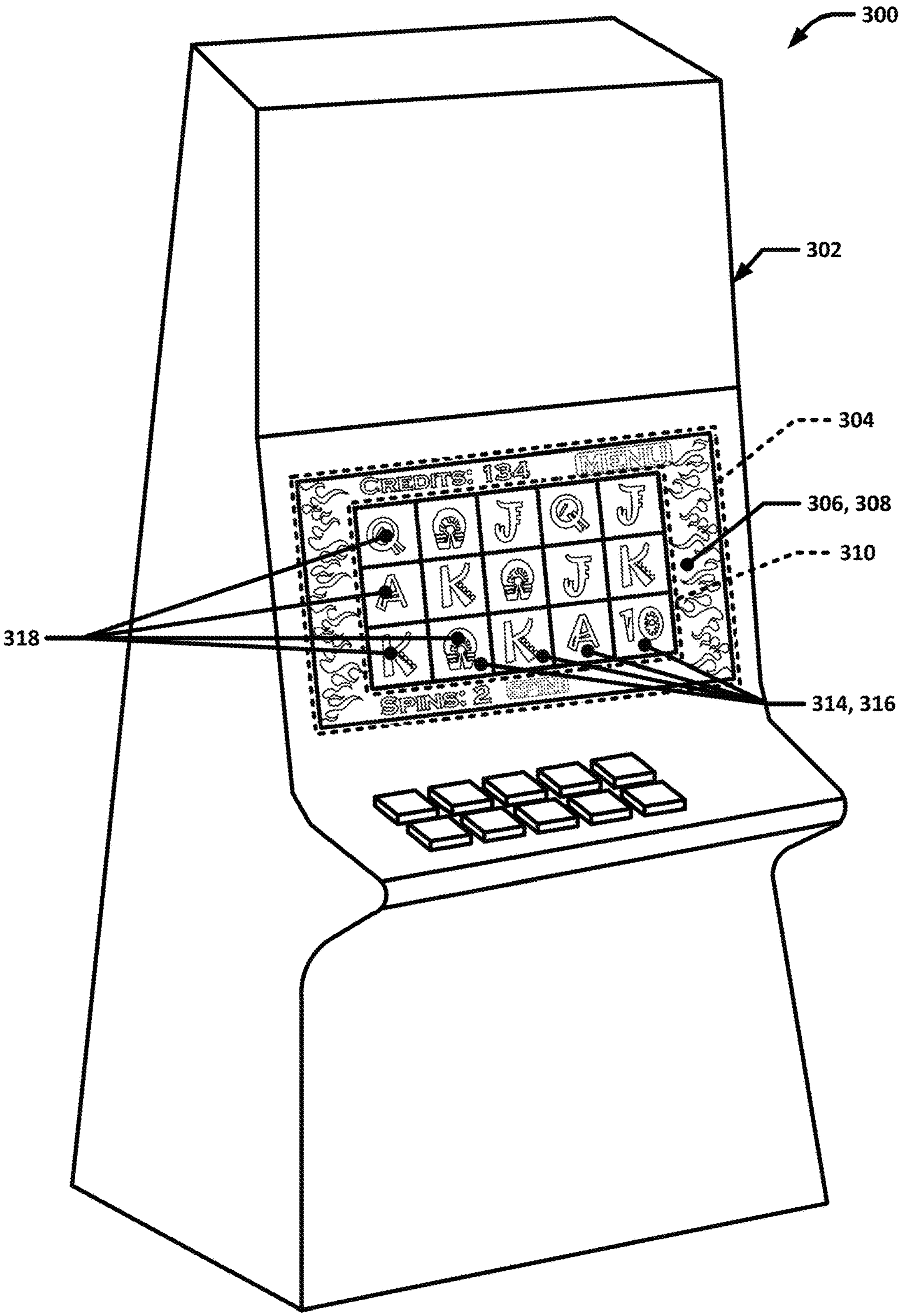
FIG. 3 depicts an electronic gaming machine that includes a cabinet or housing as well as a dynamic display.

FIG. 3 depicts an electronic gaming machine 300 that includes a cabinet or housing 302 similar to that discussed above with respect to various example electronic gaming machines as well as a dynamic display. The housing 302, in this example, includes various systems such as player user interfaces (buttons, for example), credit acceptor devices, audio devices, etc., similar to those discussed in the earlier example electronic gaming machines. However, as mentioned above, in contrast to conventional electronic gaming machines, the electronic gaming machine 300 includes a dynamic display 304. The dynamic display 304 has a display frame 306 that encircles an opening 310; the display frame 306 includes one or more first display panels 308. In this example, the display frame 306 includes a single, rectangular-shaped first display panel 308 with a rectangular opening 310 in the middle. Located within the opening 310 of the display frame 306 are a plurality of movable display units 314—in this example, there are 15 movable display units 314, each of which corresponds with a different "reel stop" 318 of a reel-based wagering game. Each movable display unit 314 includes a second display panel 316 that extends to the edges of each movable display unit 314; the one or more first display panels 308 and the second display panels 316 may form a generally continuous display surface when viewed along an axis perpendicular to the one or more first display panels 308 and when the movable display units 314 are positioned such that the second display panels 316 are nominally co-planar with the one or more first display panels 308. Generally speaking, the only interruptions in the generally continuous display surface may be at the edges of the opening 310 and at the edges of the movable display units 314, where there may be small seams visible between the one or more first display panels 308 and the second display panels 316.

As can be seen, both the one or more first display panels 308 and the second display panels 316 may display graphical content, such as graphical images or animations. In this example, the second display panels 316 display symbols for a reel-type wagering game, each corresponding with a different reel stop 318 of a virtual reel. The one or more first display panels 308, in this example, are displaying graphics of flames along the sides as well as a credit balance and remaining number of reel spins for the wagering game. The content of the one or more first display panels 308 and the second display panels 316 may be coordinated so as to present a unified, coordinated display of graphical content.

Figure 4:
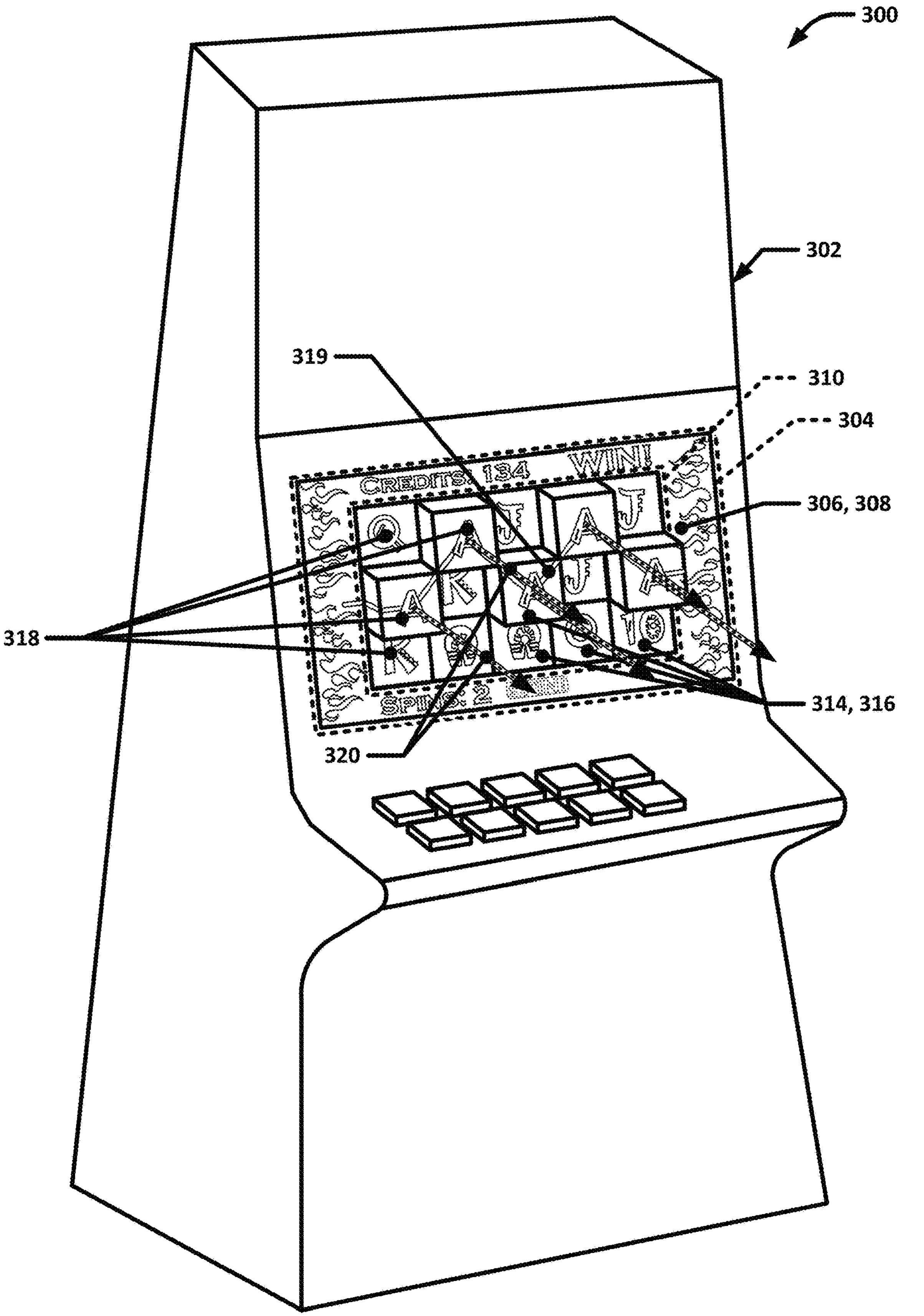
FIG. 4 depicts the electronic gaming machine of FIG. 3 with the dynamic display in a first actuated state.

FIG. 4 depicts the electronic gaming machine of FIG. 3 with the dynamic display in a first actuated state. As can be seen, five of the movable display units 314 have been translated along first axes 320 to cause those five movable display units 314 to be proud of the display frame 306. To a player, the five raised movable display units 314 will appear to have pushed out of the electronic gaming machine 300 towards the player. In this particular example, the movable display units 314 that have been translated were selected for translation since they displayed a winning pattern of reel stops 318—in this case, an "M" or inverted "W" pattern of identical reel stops ("A" reel stops in this example). Such a winning pattern may be highlighted, for example, by a payline 319, which may span across multiple second display panels 316 as well as the one or more first display panels 308. In this particular example, the movable display units 314 are similar to those discussed with reference to FIGS. 12 through 17 and have third display panels on the sides panels of the movable display units which may be caused to display additional graphical content—in this case, the additional graphical content includes a line segment of the payline 319 that bridges between second display panels 316 that are at different elevations from adjacent portions of the one or more first display panels 308 (a similar effect may be used to span between adjacent second display panels 316 that are at different elevations).

Figure 5:
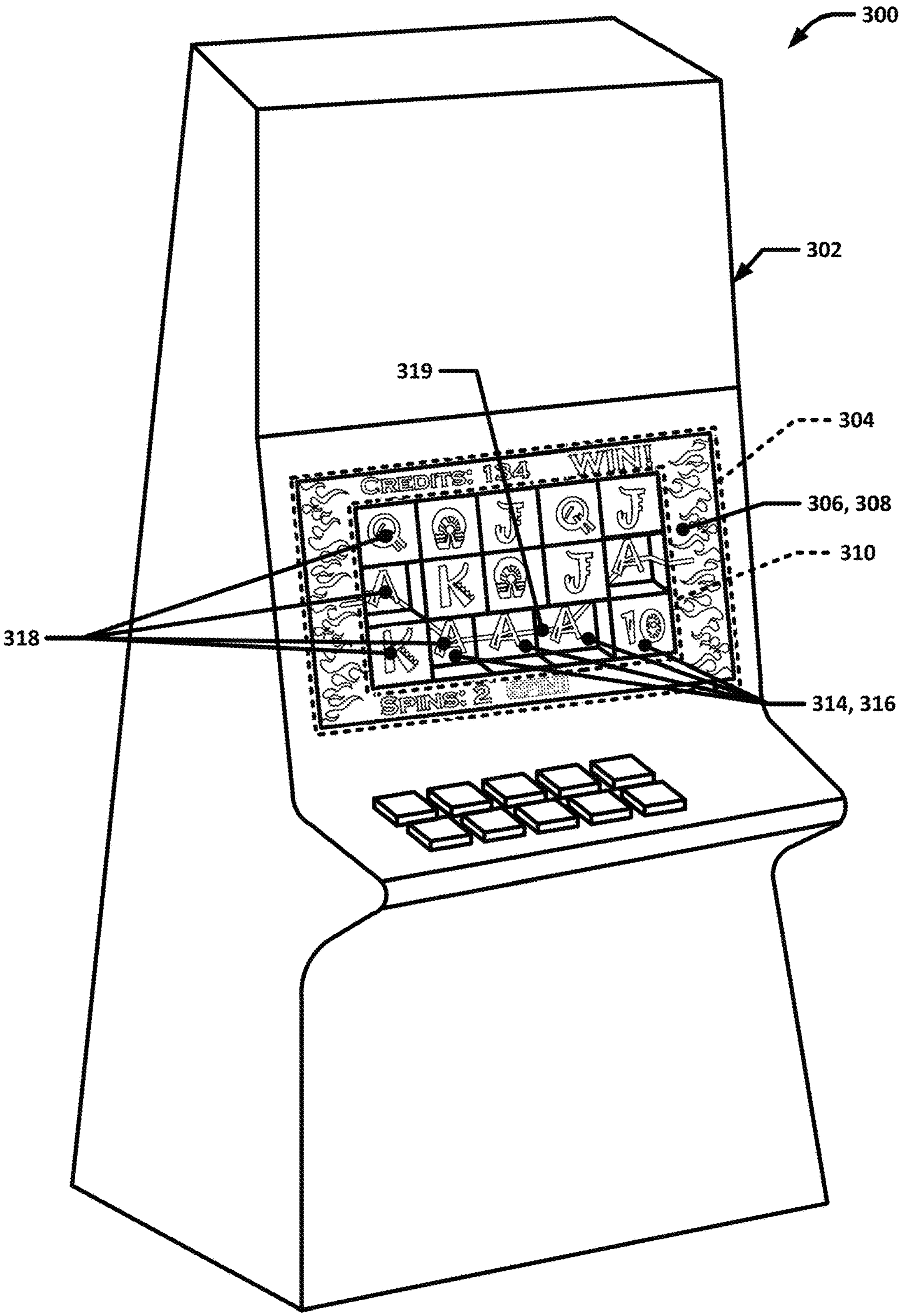
FIG. 5 depicts the electronic gaming machine of FIG. 3 with the dynamic display in a second actuated state.
Figure 6:
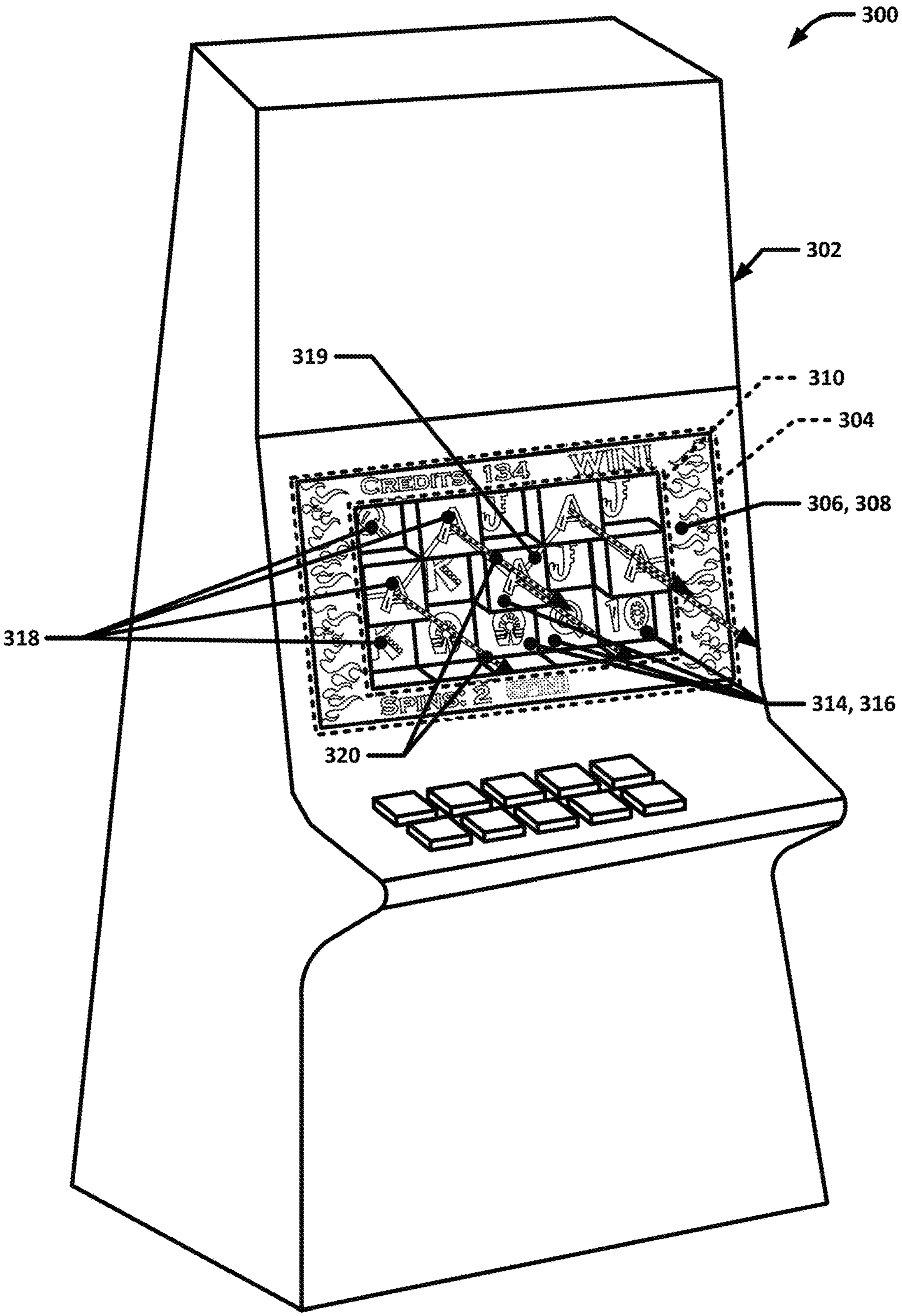
FIG. 6 depicts the electronic gaming machine of FIG. 3 with the dynamic display in a third actuated state.

FIG. 5 depicts the electronic gaming machine of FIG. 3 with the dynamic display in a second actuated state. As can be seen, a different combination of five movable display units 314 have been actuated so as to translate along their respective first axes 320 (not shown, but similar to those shown in FIG. 4). The translation of the movable display units 314, in this case, occurs in the opposite direction from that shown in FIG. 4, resulting in a "recessed" appearance to the translated movable display units 314. Similar to FIG. 4, the "recessed" movable display units 314 are associated with a payline 319 that indicates the winning pattern. Alternatively, in some implementations, the gaming machine may be configured to leave the movable display units 314 displaying a winning pattern alone and instead cause the movable display units 314 displaying symbols that are not part of the winning pattern to retract into the dynamic display 304, as is shown in FIG. 6. Such implementations may be particularly useful, for example, when there is a cover glass that protects the dynamic display 304 from being touched by players and that is generally flush against the display frame 306. In such implementations, it may not be possible to move the movable display units 314 to be proud of the display frame 306 without having the movable display units 314 collide with the cover glass. Accordingly, the movable display units 314 may, in some such implementations, only be able to be retracted into recessed positions relative to the display frame 306 (or have their ability to protrude proud of the display frame 306 limited by the cover glass) and restored to being flush with the display frame 306. Again, the movable display units 314 in this example are similar to those discussed with reference to FIGS. 12 through 17, and the opening 310 may have interior walls that have additional display panels that may be used to display graphical content in a similar manner to the third display panels of FIG. 4 discussed above. In some implementations, the cover glass may take the form of an elastic, clear membrane that may be placed over the movable display units 314 such that when the movable display units 314 are extended outwards, the membrane is able to distend to accommodate such displacement.

It will be recognized that different implementations of dynamic displays may operate in different ways. For example, in some dynamic displays, the movable display units 314 may be configured to be translated between a number of positions, including positions that are proud of the display frame 306, positions that are recessed with respect to the display frame 306, and positions that are flush with the display frame 306. In other implementations, the movable display units 314 may be configured to be movable only between a position that is flush with the display frame 306 and one or more positions that are recessed from the display frame 306. In yet further implementations, the movable display units 314 may be configured to be movable between a position that is flush with the display frame 306 and one or more positions that are proud of the display frame 306.

While in the depicted electronic gaming machine, each movable display unit 314 is associated with a different reel stop (or region within which a reel symbol may be displayed), other implementations may feature additional movable display units, e.g., there may be 4, 9, 25, etc. movable display units used for each reel stop, or the movable display units may be sized and shaped so as to correspond with areas of the display that do not necessarily correspond with reel stops. The size of the movable display units may also vary considerably. For example, some movable display units may have second display panels sized to be several inches on each side, e.g., 3" to 5" wide by 3" to 5" tall, although other implementations may feature much smaller second display panel sizes, e.g., ¾" square, ⅝" square, ½" square, and so forth. In some implementations, as discussed later herein, the second display panels may even be on the order of ~1 mm square or ~1.5 mm square, or of an even smaller size. In such implementations, the second display panel may even be a single-pixel display panel, e.g., an individual LED or a set of multiple LEDs of different colors that may be actuated in various combinations and to different degrees of intensity to provide a particular combined color spectrum. In various other implementations, the movable display units may have second display panels that are non-rectangular in aspect ratio, e.g., rhomboid, parallelogram, triangular, hexagonal, pentagonal, etc. and/or are different sizes. In some implementations, the movable display units may have second display panels that are not even a regular geometric shape, but may, for example, take on more complicated shapes. For example, in a wagering game in which the player may be awarded a "key" shape, gaming machine may have one or more movable display units that have a second display panel or panels that are shaped, in aggregate (or singly if including a single movable display unit) in the shape of a key. When the player is awarded such a key, then a graphic of the key may be caused to be displayed on the second display panel(s) of the movable display units and the movable display unit(s) displaying such content may be caused to extend outwards relative to the portions of the display surrounding the key graphic (or, similarly, the movable display units displaying the key graphic may be caused to remain stationary while surrounding movable display elements are caused to be retracted relative thereto) to emphasize the graphical content.

It will also be recognized that the dynamic displays discussed herein may be used in a manner other than that shown in FIGS. 4 and 5. Most notably, the movable display units 314 may be actuated in a variety of different circumstances, not just to facilitate display of a winning outcome. For example, in some wagering games, a player may be able to "freeze" certain reel stops so that high-value symbols that appear during one play of the game remain in place for a subsequent play of the game. In such instances, a dynamic-display enabled gaming machine may be configured, for example, to cause the movable display units displaying such reel stops to be actuated so as to extend outwards or retract inwards so as to highlight their "fixed" status. Alternatively, the dynamic display may be controlled so that the reel stops other than the selected reel stops are moved. For example, if a wagering game with a dynamic display enters a state in which the player is provided with the opportunity to pick a predefined number, e.g., 3, of reel stops that will remain at their currently displayed positions (or symbols) for the next reel spin, the movable display units depicting reel stops that are not selected by the player may be caused to retract to a recessed position relative to the selected reel stops, thus emphasizing their non-selection. In another implementation, the entire field of movable display units may first be actuated into a slightly recessed state, e.g., recessed a quarter inch or so, from the display frame and/or cover glass at the start of such a player-pick feature. As the player selects each reel stop that is to be "fixed", e.g., by touching the touch screen interface in a location that corresponds to the reel stops in question, the movable display units for the selected reel stops may be caused to move forward to be flush against the cover glass. After the player has selected the maximum number of "fixed" reel stops permitted by the feature or otherwise signaled that reel stop selection is complete (by selecting a "confirm selection" button, for example), then the movable display units displaying the remaining, unselected reel stops may, for example, be translated to a further recessed position.

In some implementations, for example, the player may be associated with a loyalty program that includes a plurality of levels; the player's level in the loyalty program may be based on the player's engagement with the loyalty program, e.g., how often they log in or play under the loyalty program or how much they wager while logged in through the loyalty program. In these embodiments, one or more portions of the 3D images that may be displayed using movable display units may be based on the loyalty program level associated with the player. For example, a dynamic display device may animate a bouncing or spinning golden ball for a gold level player while having the movable display units showing the golden ball extend towards the player.

In some further implementations, a game controller may detect a mobile device of a player in proximity to a gaming device, e.g., using Bluetooth, NFC, or location reporting services in an app that is loaded and running on the mobile device and that is in communication with the game controller, e.g., via the Internet. If the gaming device is in attract mode, the game controller may cause a dynamic display device with movable display units to attract the attention of the player associated with the mobile device by, for example, causing the player's first name to be displayed on movable display units of the dynamic display device with an invitation to play the gaming device while also causing the movable display units featuring such content to move or displace to draw attention to the gaming device.

In some further implementations, a plurality of electronic gaming machines with dynamic display devices may communicate via a network or other communications interface. A controller may coordinate a 3D movable display unit visual effect between such electronic gaming machines such that a 3D effect that involves translating movable display units may begin on one electronic gaming machine and then appear to "move" in a direction towards a neighboring electronic gaming machine and then "cross over" into the dynamic display of that neighboring electronic gaming machine. This effect may then be continued for additional neighboring electronic gaming machines. For example, a "wave" pulse where sequential columns of movable display units are caused to extend and then retract to give the illusion of a "ripple" or "wave" that travels from left to right across a dynamic display device may be caused to continue on the dynamic display device of the electronic gaming machine to the right of that electronic gaming machine, and so on. In another example, a 3D rocket ship may start on one electronic gaming machine and continue along a plurality of electronic gaming machines that are positioned adjacent to each other. In these embodiments, multiple electronic gaming machines may simultaneously display part of the connected 3D image. In such implementations, a server device may coordinate the images between the corresponding electronic gaming machines. In some embodiments, the server device transmits display and movable display unit movement instructions to each of the electronic gaming machines.

Figure 7:
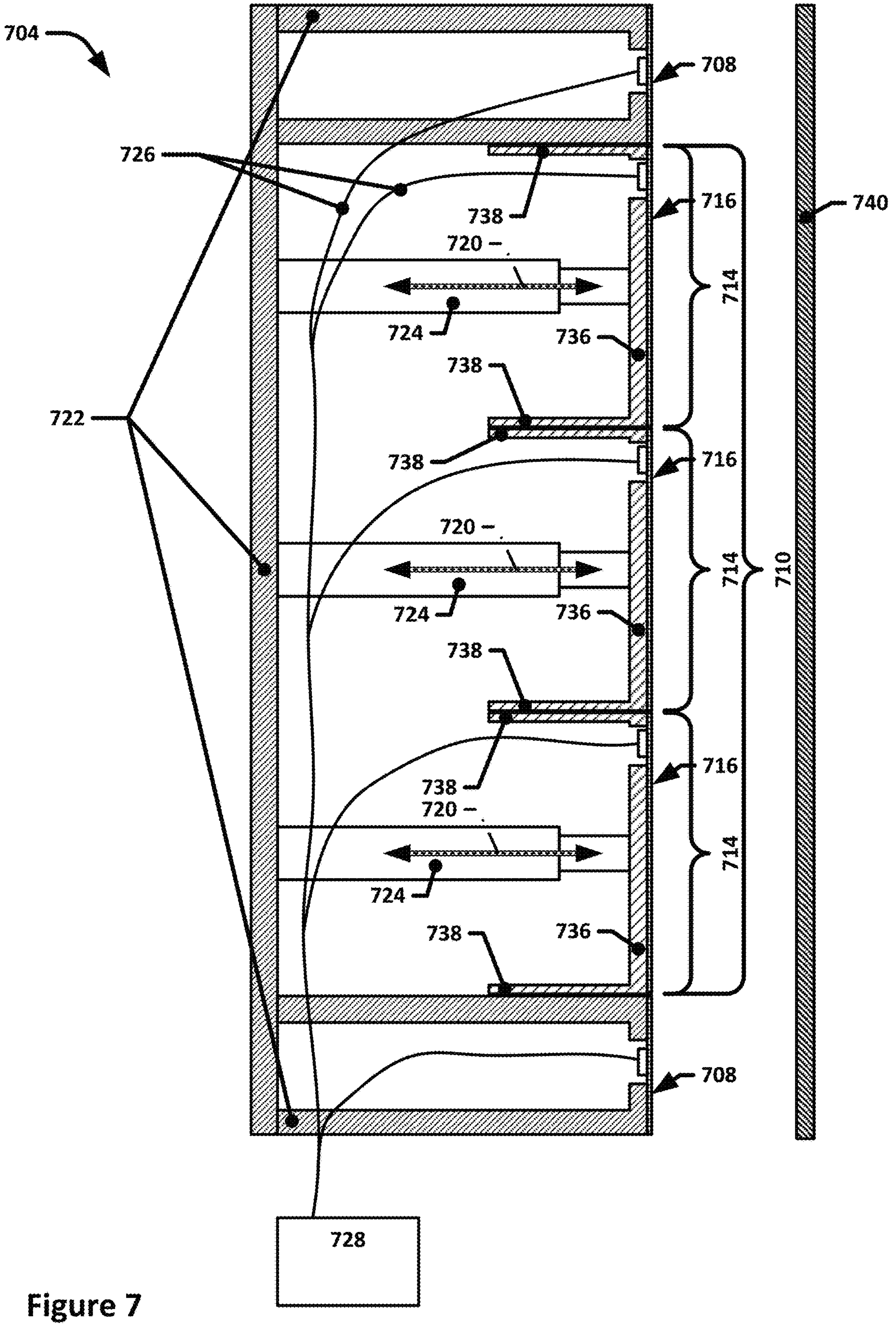
FIG. 7 depicts a side view of an example dynamic display for use in an electronic gaming machine.

FIG. 7 depicts a side view of an example dynamic display for use in an electronic gaming machine. The dynamic display 704, in this example, includes a support structure 722 that may serve as a foundation or overall support structure for the dynamic display 704. The support structure 722, for example, may be equipped with mounting points for fasteners to all the support structure 722, and thus the entire dynamic display 704, to be mounted within an electronic gaming machine.

The support structure 722 may, for example, serve as part of a display frame and may include a portion or portions that provide rigid support to one or more first display panels 708 that are used in the display frame of the dynamic display 704. The one or more first display panels 708 may have an opening 710, and one or more movable display units 714 may be positioned within the opening 710. The support structure 722 may also include a portion or portions that provide support to a plurality of linear drive mechanisms 724, which may be any electrically controllable actuation device that is able to cause the movable display unit 714 connected therewith to translate along an associated first axis 720. In the example dynamic display 704, the linear drive mechanisms 724 are linear actuators, e.g., linear solenoid actuators, hydraulic or pneumatic pistons, screw drives, or other types of linear actuator mechanisms. Alternatively or additionally, the movable display units 714 may be interfaced with linear guides or rails to allow for sliding motion along the first axes 720 and crank- or linkage-driven actuators may be used to impart a motive force to such movable display units 714. The linear drive mechanisms 724, the one or more first display panels 708, and second display panels 716 may be operatively or communicatively connected with a game controller 728, which may provide signals that cause the linear drive mechanisms to be selectively actuated to cause the movable display units 714 connected therewith to translate during presentation of a wagering game in association with an occurrence of one or more events during presentation of the wagering game, by way of cables 726. The game controller 728 may include, for example, one or more processors and one or more memory devices that store computer-executable instructions for controlling the one or more processors to cause the equipment operatively connected thereto to perform certain actions, e.g., cause certain graphical content to be displayed on the one or more first display panels and the second display panels or cause the linear drive mechanisms to actuate in a particular manner. The game controller 728 may be operatively or communicatively connected with the one or more first display panels, the second display panels, and the linear drive mechanisms in order to facilitate such control.

The movable display units 714 may be constrained in their movement, e.g., through the use of guide rails, tracks, grooves, channels, splines, keyways, or other constraints, so as to generally only be able to translate along a single axis. In the depicted example, each movable display unit 714 includes an understructure that serves to support the second display panel 716 that is part of the movable display unit 714. The understructure, in this example, has a generally box-like aspect, with a platform 736 with a major surface perpendicular to the corresponding first axis 720 and four smaller side panels 738 extending away from the platform in a direction perpendicular to the platform and parallel to the first axis 720. The side panels 738, in this example, extend down towards the support structure 722 that they may effectively serve as guides or constraints on the motion of adjacent movable display units 714, thereby limiting their movement to be generally along the corresponding first axes 720.

In some implementations, the dynamic display 704 may be located behind a cover glass 740 that may be spaced off from the display frame so as to allow the movable display units 714 to be actuated so as to be proud of the display frame, e.g., to the maximum extent permitted by the travel of the linear drive mechanism, without colliding with the cover glass. The cover glass may be used to prevent players or other unauthorized personnel from touching or otherwise interfering with the operation of the dynamic display 704. The cover glass 740, for example, may be set in the exterior surface of a housing of an electronic gaming machine, and the dynamic display 704 may be housed within the electronic gaming machine behind the cover glass 740. In other implementations, the cover glass 740 may be placed on top, e.g., contacting with or in very close proximity thereto, the display frame 706 such that the movable display units 714 may generally only be transitioned to recessed positions relative to the display frame 706 or to positions flush with the display frame 706. In some implementations with a cover glass 740, the cover glass 740 may also include a touch screen interface, e.g., a capacitive, resistive, or other type of touch-sensitive input interface to allow a player or user to input commands relative to the content displayed on the movable display units 714 and/or the display frame 708, e.g., to select paylines, reel stops, or other items (such as "sping" buttons, menu buttons, and/or help/rules buttons) displayed on the display frame 708 and/or the movable display units 714.

Figure 8:
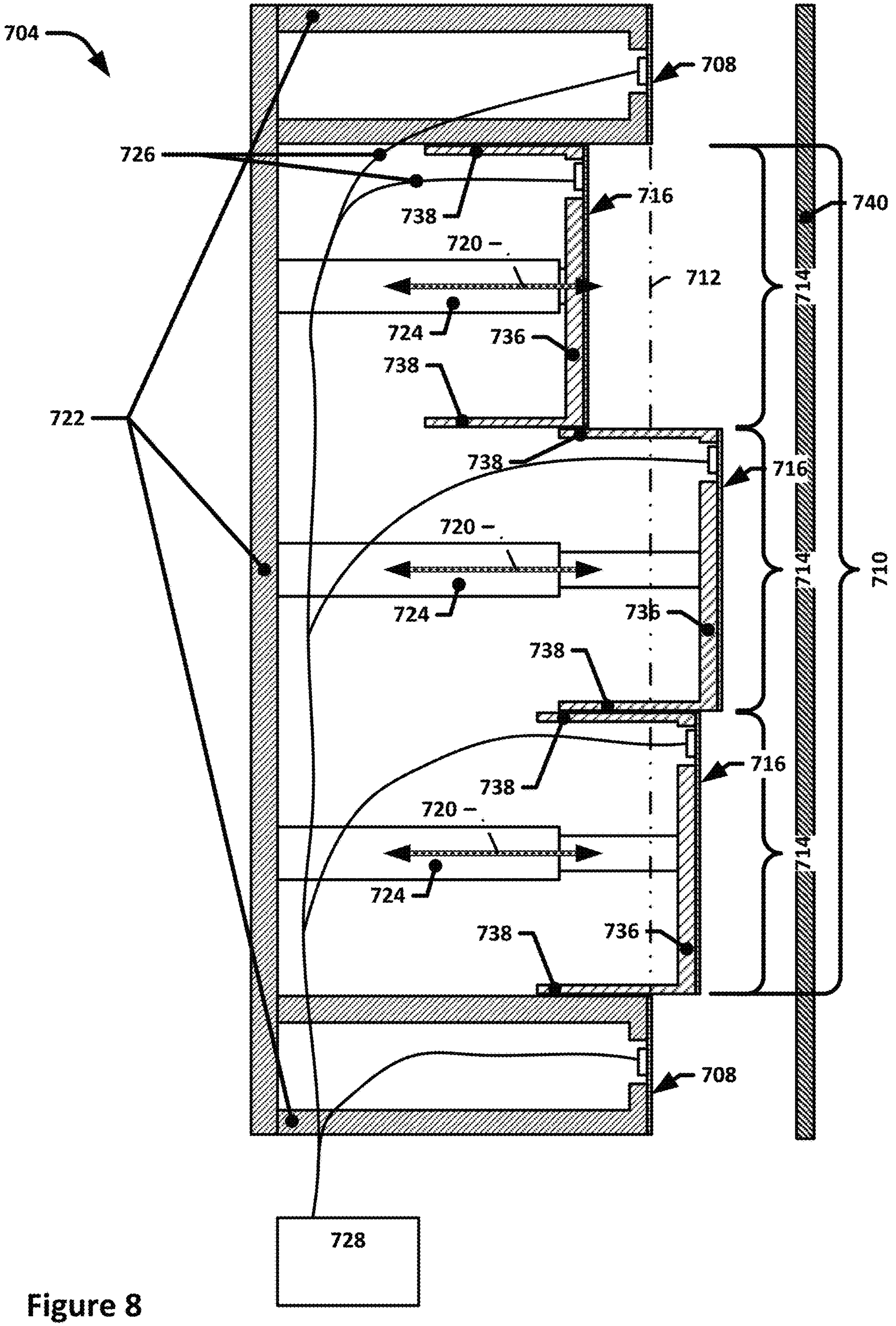
FIG. 8 shows the dynamic display of FIG. 7 in an actuated state.

FIG. 8 shows the dynamic display of FIG. 7 in an actuated state in which the linear drive mechanisms for the three movable display units shown have moved the movable display units connected therewith to various locations. As can be seen, the movable display units 714 have each been translated along their respective first axes 720 by their respective linear drive mechanisms 724 with respect to a nominal display plane 712, which may be generally coplanar with the one or more first display panels 708 that are part of the display frame. Such displacement of the movable display units 714 may be controlled so as to be choreographed with the display of particular graphical content on the one or more first display panels 708 and the second display panels 716.

The basic operational premise of the dynamic displays discussed above may be augmented or enhanced through additional features in some implementations. Examples of such additional features are discussed below with respect to several example dynamic displays. For clarity, structures in the following Figures that correspond with structures in FIGS. 7 and 8 and that share the same last two digits of the structures in FIGS. 7 and 8 may generally be assumed, unless otherwise indicated, to be similar to the corresponding structures in FIGS. 7 and 8. In such cases, the discussion of such Figures may not explicitly describe such elements, but the description of the corresponding elements in FIGS. 7 and 8 should be understood to be applicable to such structures in the Figures discussed below as well.

Figure 9:
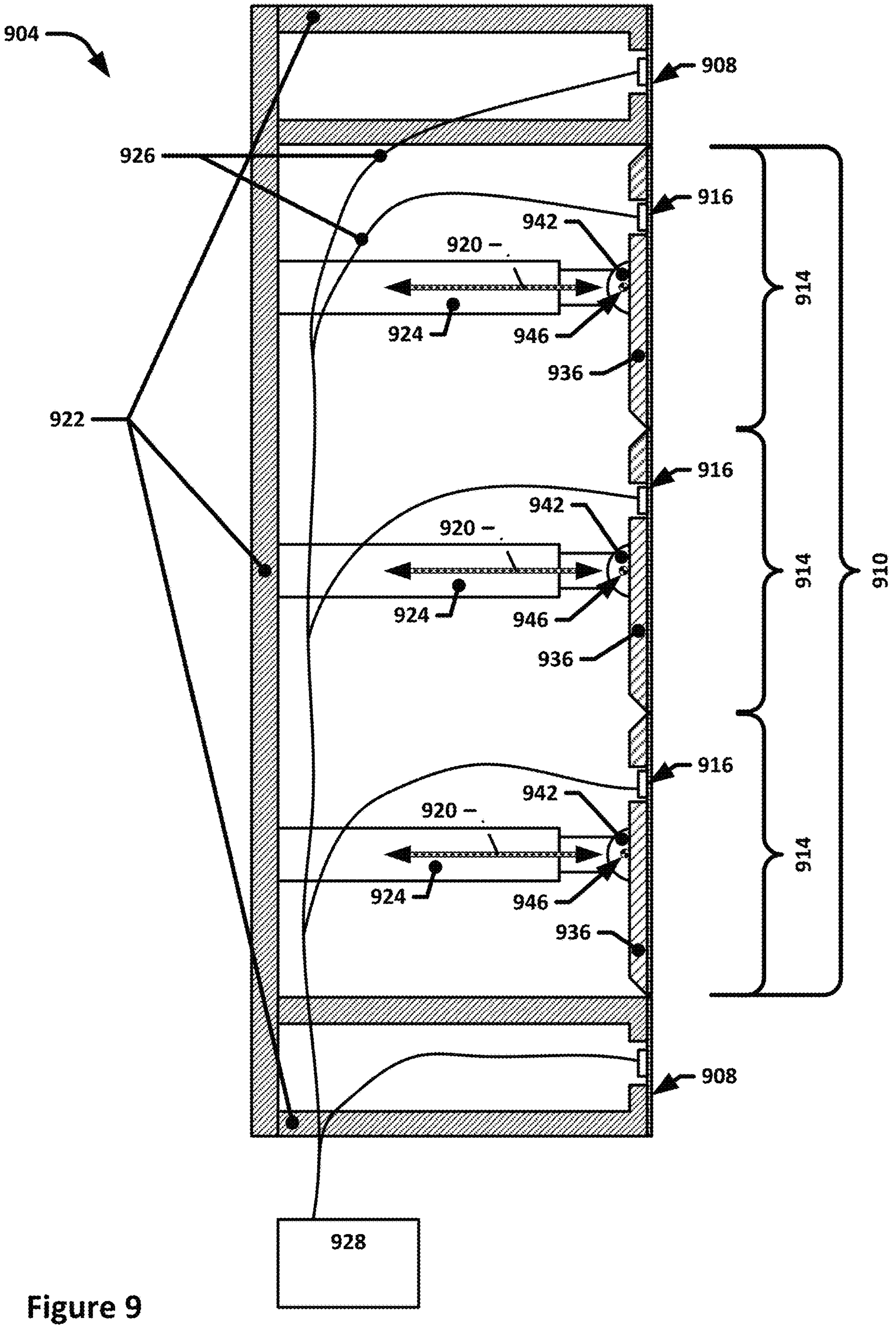
FIG. 9 depicts an example dynamic display in which the movable display units may not only be controlled to translate along corresponding first axes, but may also be controlled to pivot about axes perpendicular to the first axes.

FIG. 9 depicts an example dynamic display in which the movable display units may not only be controlled to translate along corresponding first axes, but may also be controlled to pivot about axes perpendicular to the first axes. As can be seen, platforms 936 of the understructures of each movable display unit 914 in dynamic display 904 are each connected with a respective linear drive mechanism 924 by a rotational actuator 942. The linear drive mechanisms 924 may be configured to translate the understructures, and second display panels 916 mounted thereto, along respective first axes 920, much as in the earlier-discussed examples above. The rotational actuators 942, however, may be configured to provide rotational motion of the platforms 936 (which may also be viewed as the understructures discussed previously), and thus second display panels 916 mounted thereto, about second axes 746 responsive to input received from the gaming controller 928.

Figure 10:
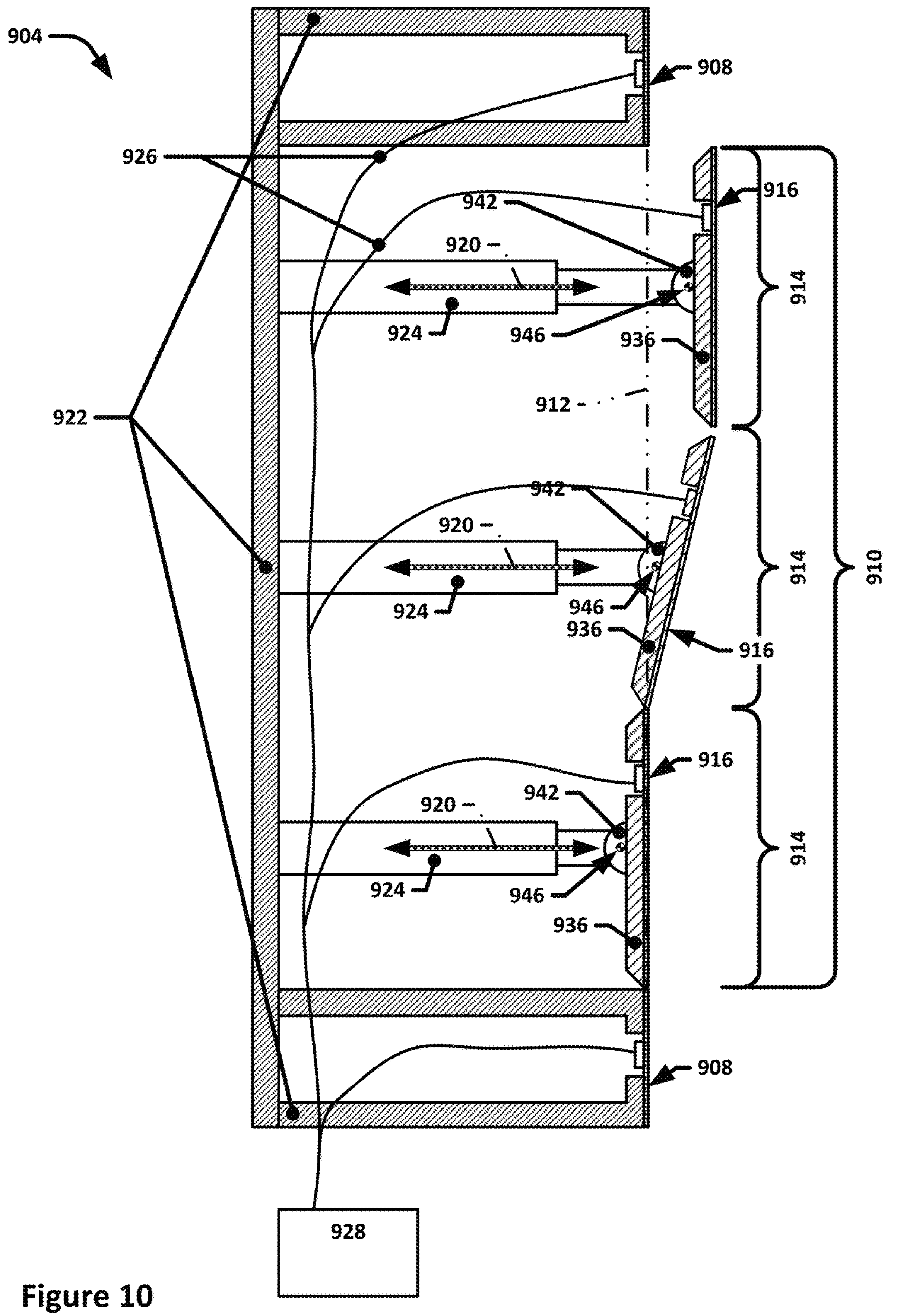
FIG. 10 depicts the example dynamic display of FIG. 9, but with two of the movable display units translated proud of a nominal display plane and with the middle movable display unit tilted through actuation of a rotational actuator associated therewith.

FIG. 10 depicts the example dynamic display of FIG. 9, but with two of the movable display units 914 translated proud of a nominal display plane 912 and with the middle movable display unit 914 tilted through actuation of the rotational actuator 942 associated therewith. Such movable display units 914 may be used to provide a more "fluid" appearing surface (with just translation, differences in elevation between adjacent movable display units will have a stepped or "aliased" appearance, whereas movable display units with rotatable actuators may be tilted so as to make the transitions between adjacent movable interfaces less abrupt). In some implementations, the rotatable actuators 942 may provide for rotation about two axes, e.g., two axes orthogonal to each other and to the first axes. Such implementations may allow for the movable display units to be tilted to align better with movable display units located on any side of the tilted movable display unit.

As can be seen, the movable display units 914 lack side panels that extend from the platforms 936, as was the case with the movable display units 714 discussed earlier. This avoids possible interference of the side panels of adjacent movable display units with each other during tilting of the movable display units. Instead, the platforms 936 may have undercut edges 944 to provide additional backside clearance for reducing the possibility of a collision for at least some range of tilting motion. In other implementations, the movable display units 914 may include side panels that extend from the platforms 936 and reposition in concert with the tilt of movable display units 914 such that such collisions are avoided.

Figure 11:
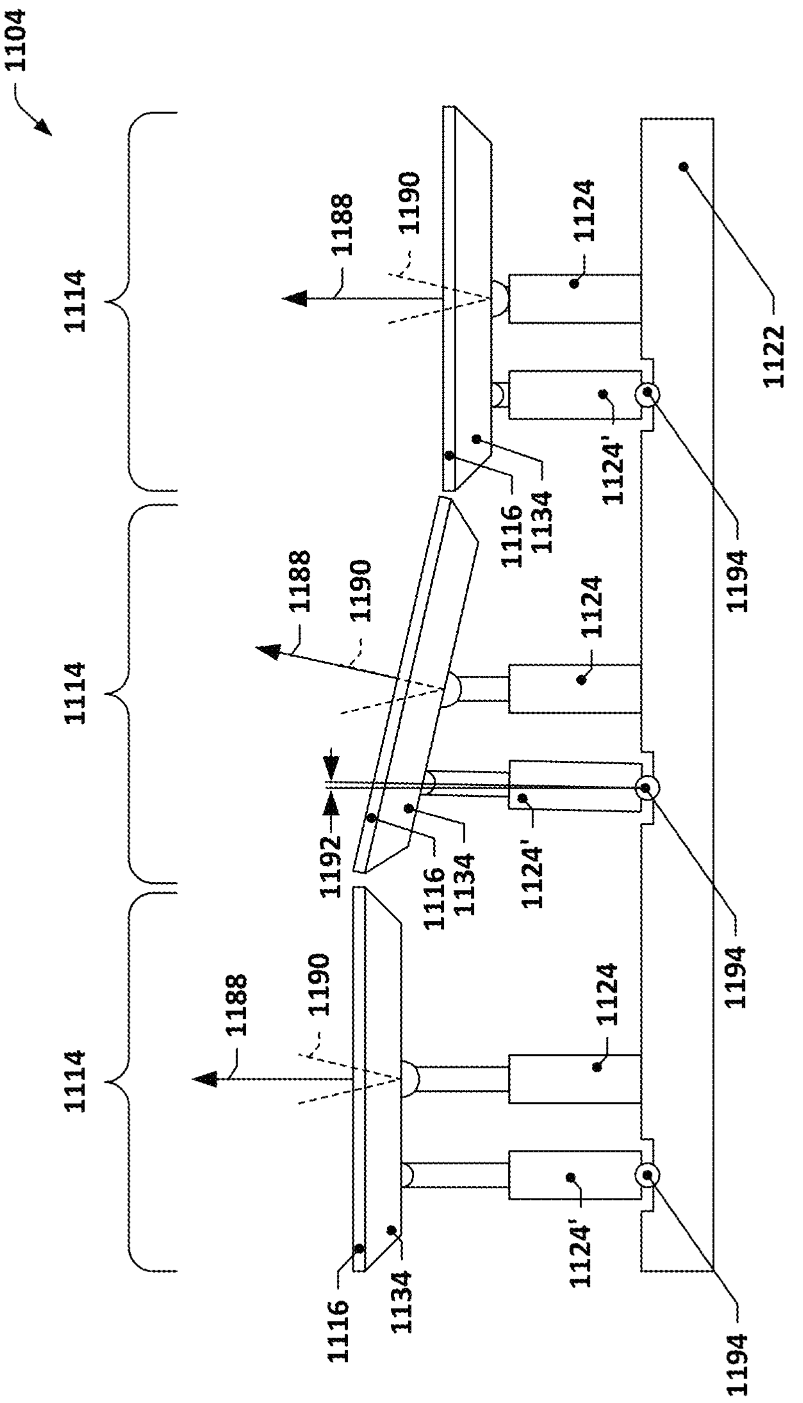
FIG. 11 depicts an example dynamic display device in which each movable display unit includes multiple linear drive mechanisms.

In another implementation, such as is shown in FIG. 11, a movable display unit may have multiple actuators that may all be connected with a common second display panel, e.g., three or four linear drive mechanisms that have linearly displaceable ends that are each rotatably or movably connected with the understructure supporting the second display panel of the movable display device. For example, if three actuators are used per understructure, each actuator may be extended in concert and by the same amount to cause the understructure to remain flat/level (as compared with the nominal display plane, for example). However, if one or two of the actuators are extended to different amounts (from the remaining actuator(s) and/or each other), the understructure may be caused to tilt in a particular manner. In such implementations, one of the actuators, e.g., an actuator that connects with the understructure near the center of the second display panel, may serve as an "anchor" and may be anchored to the support structure for that dynamic display panel such that the actuator cannot, itself, tilt, thus anchoring the center of the understructure, more or less, to be constrained to linear movement along the center axis of that actuator. The other actuators that are movably connected with the understructure may be movably connected with the support structure as well such that they can tilt relative to the support structure and about an axis that is perpendicular to the translation axis of the "anchor" actuator—in one implementation, there may be two actuators for each understructure in addition to the "anchor" actuator, and each of those additional actuators may be rotatably connected with the support structure such that each can pivot relative to the support structure about a tilt axis that is perpendicular to the translation axis of the "anchor" actuator and perpendicular to the tilt axis of the other additional actuator. Such an arrangement may allow for the understructure to be dynamically tilted such that an axis perpendicular to the second display panel can be oriented to any point within a conical volume with the center axis of the conical volume aligned with the translation axis of the "anchor" actuator and the with the point of the conical volume intersecting with the axis perpendicular to the second display panel (with the conical volume growing in diameter with increasing distance from the "anchor" actuator).

FIG. 11 depicts an example dynamic display device in which each movable display unit includes multiple linear drive mechanisms. In FIG. 11, a dynamic display device 1104 is shown that includes three movable display units 1114. Each movable display unit 1114 has a second display panel 1116 (no first display panels/display frame are shown in this example, but may optionally be included in a manner similar to other implementations discussed herein) supported by a corresponding understructure 1134 that is connected with three linear drive mechanisms 1124. In FIG. 11, only two of the linear drive mechanisms 1124 for each movable display unit 1114 are shown; the third is positioned behind the center linear drive mechanism 1124 for each movable display unit 1114. The linear drive mechanism 1124 for each movable display unit 1114 is the "anchor" linear drive mechanism and is constrained so that the end of the linear drive mechanism 1124 is constrained to only translate linearly along a single axis. The end of the linear drive mechanism 1124 may be connected with an understructure 1134 of the corresponding movable display unit 1114 using a spherical or gimballed rotational joint, thereby allowing the understructure 1134 and a corresponding second display panel 1116 supported thereby to be rotated in any direction for at least some angular distance. For example, the understructure 1134 and the second display panel 1116 may be rotatable such that a normal vector 1188 to the second display panel 1116 falls within a conical volume 1190 that has a center axis that is aligned with the linear translation axis of the linear drive mechanism 1124 and a point that intersects the normal vector 1188. Due to the use of a spherical rotational joint or gimballed rotational joint, the second display panel may be oriented to any direction that results in the normal vector 1188 falling within the conical volume 1190.

The linear drive mechanism 1124' is similar to the linear drive mechanism 1124, except that it may be mounted to support structure 1122 with a rotational joint 1194 such that it can pivot relative to the support structure about a rotational axis, e.g., a rotational axis perpendicular to the page in FIG. 11, to allow for slight misalignment, e.g., tilt 1192, between the linear translation axes of the linear drive mechanisms 1124 and 1124'. When the linear drive mechanisms 1124 and 1124' are actuated in concert and by the same amount, then no misalignment between their respective translation axes will occur. However, when actuated asynchronously and/or by different amounts, the resulting displacement mismatch will cause the corresponding understructure 1134 and the second display panel 1116 supported thereby to tilt.

It will be understood that other implementations of tiltable movable display units with multiply linear drive mechanisms may be implemented differently, e.g., using linear drive mechanisms where the linear drive mechanism linear translation axes remain aligned but the rotational joints connecting the linear drive mechanisms to the understructure may be equipped with some form of compliant or sliding interface to allow the understructure to tilt without binding.

Figure 12:
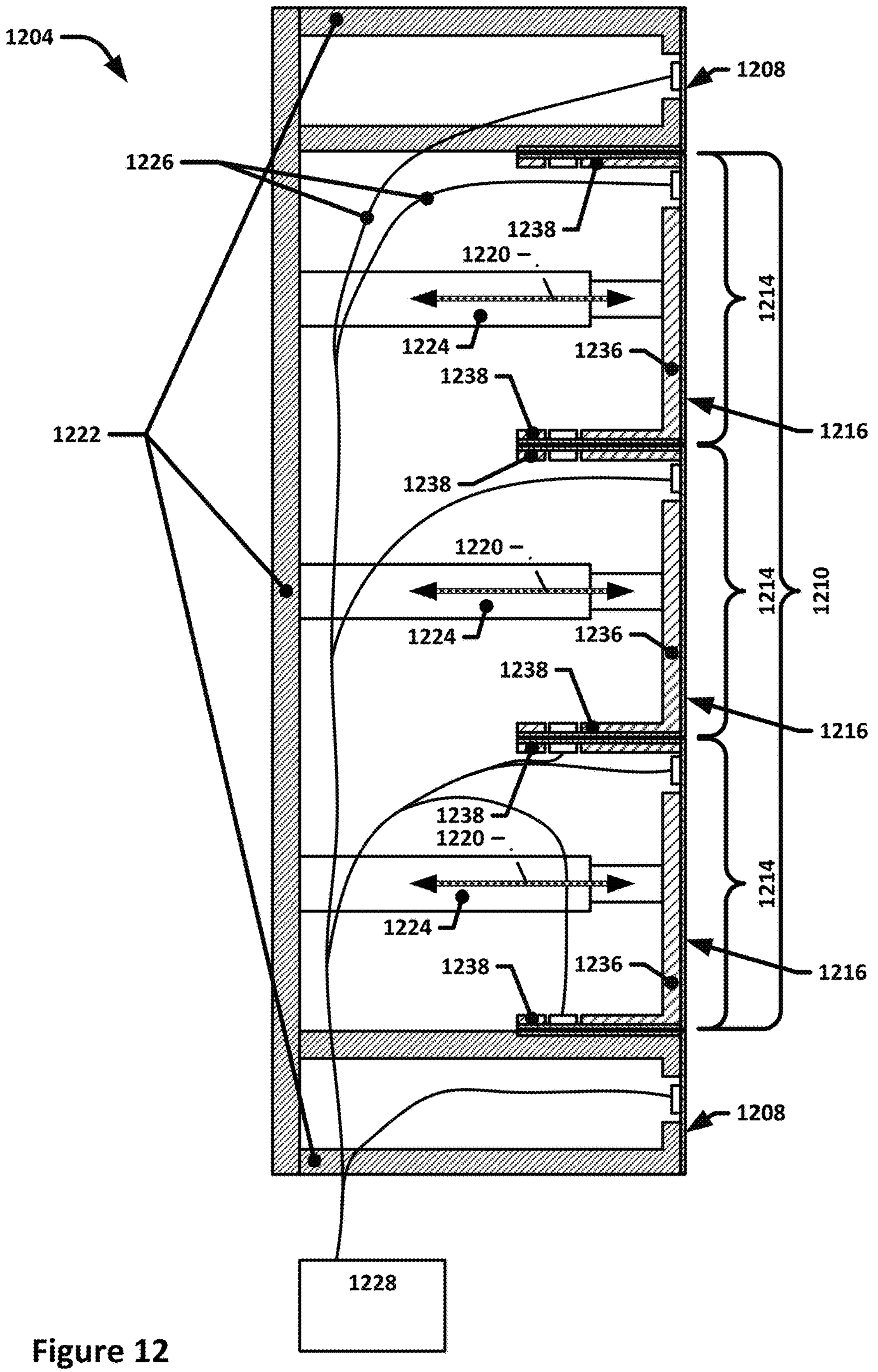
FIG. 12 depicts an example dynamic display in which the movable display units include side panels featuring additional controllable visual elements.

FIG. 12 depicts an example dynamic display in which the movable display units include side panels featuring additional controllable visual elements. In FIG. 12, each movable display unit 1214 includes an understructure that has side panels 1238 that extend away from a platform 1236 and towards a linear drive mechanism 1224 connected with the corresponding movable display unit 1214. The side panels 1238 each support a corresponding third display panel 1248 (see FIG. 13), which may also be communicatively or operatively connected with a game controller 1228. The third display panels 1248 for a movable display unit 1214 may be controlled so as to display graphical content that may, for example, enhance or coordinate with the graphical content displayed on the second display panel 1216 of that movable display unit 1214, as shown in FIG. 4 with the payline 319. Such dynamic displays 1204 may also include, in some implementations, fourth display panels 1249, which may be mounted such that they line the opening 1210 and face inwards towards the movable display units 1214. Such fourth display panels may be controlled in a similar manner to the third display panels 1248, e.g., to display graphical content that aligns or coordinates with graphical content on adjacent second display panels 1216 when the corresponding movable display units 1214 are retracted into the dynamic display 1204.

Figure 13:
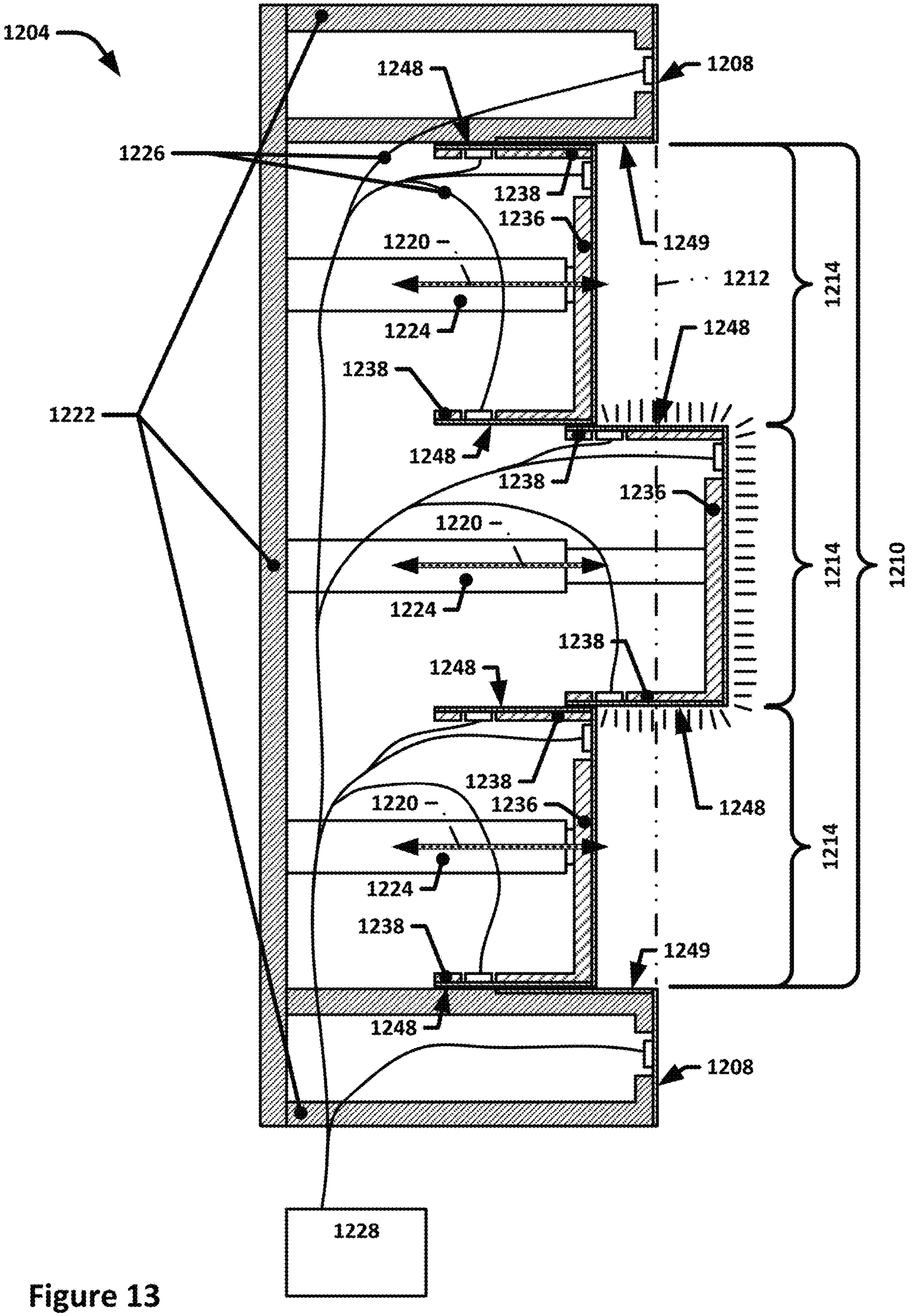
FIG. 13 depicts the dynamic display of FIG. 12 with the center movable display unit extended and the flanking movable display units retracted.

FIG. 13 depicts the dynamic display of FIG. 12 with the center movable display unit 1214 extended and the flanking movable display units 1214 retracted. As can be seen in FIG. 13, the second display panel 1208 and the third display panels 1248 have been activated to cause graphical content to be displayed (resulting in light being emitted from virtually the entire exposed surface of the center movable display unit—as indicated by the light rays emanating away from the center movable display unit 1214).

Figure 14:
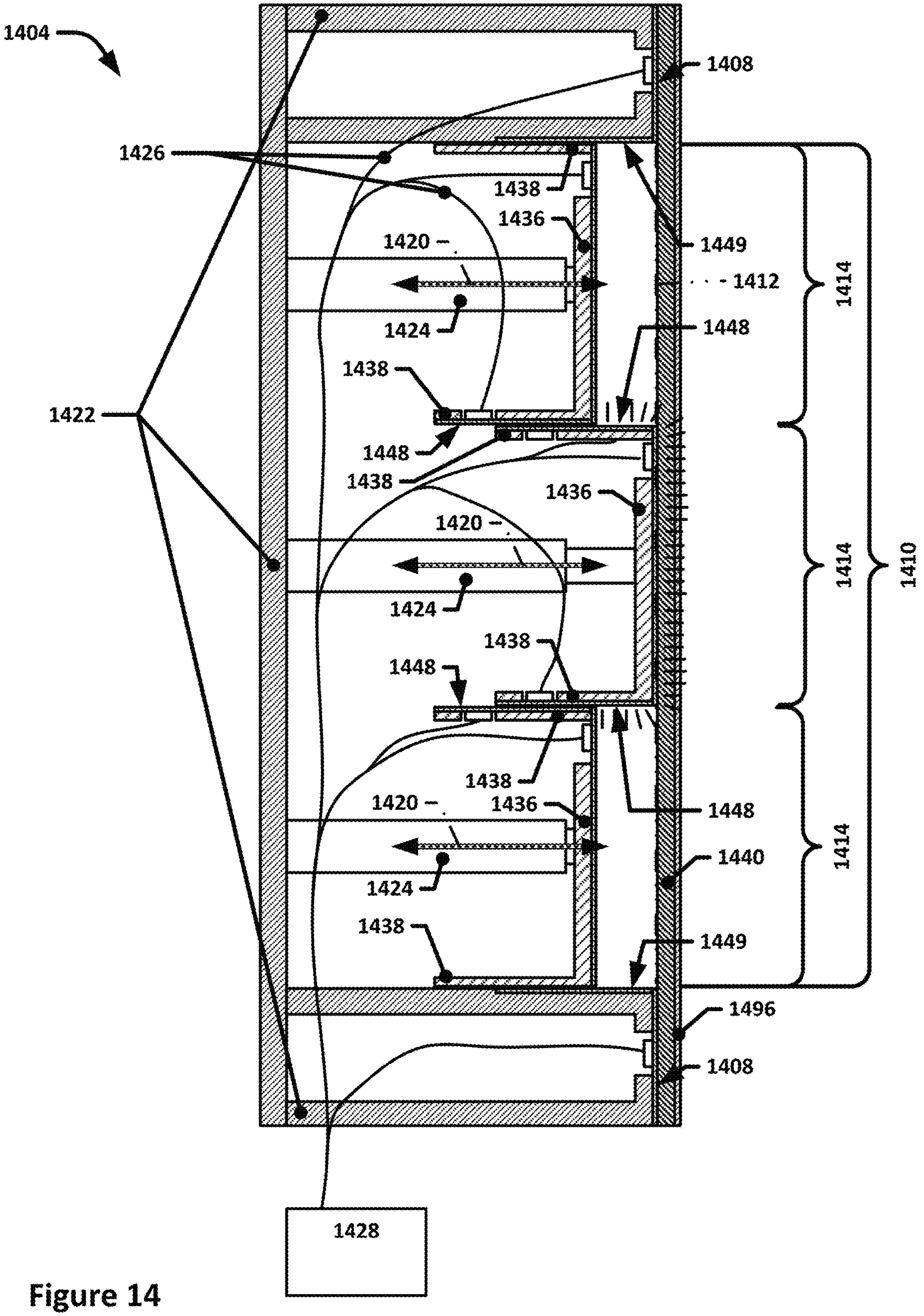
FIG. 14 depicts a dynamic display similar to that of FIGS. 12 and 13, but with a cover glass added.

FIG. 14 depicts a dynamic display similar to that of FIGS. 12 and 13, but with a cover glass 1440. Features of FIG. 14 may generally be similar to corresponding features in FIGS. 12 and 13, with such similar features sharing the same last two digits of their callout numbers; the description of elements from FIGS. 12 and 13 is generally applicable to the corresponding elements in FIG. 14 unless otherwise noted.

In FIG. 14, the cover glass 1440 is positioned proximate to or flush against the first display panel 1408 of the display frame, which limits the ability of the movable display units 1414 to extend beyond the nominal display plane 1412. As a result, movement of the movable display units 1414 may consist of movement to draw the movable display units 1414 into a recessed position relative to the cover glass 1440 or to move the movable display units 1414 to be flush against the cover glass 1440. The cover glass 1440 may optionally include a touchscreen interface 1496 to facilitate player interaction with the dynamic display.

Another difference between the dynamic display of FIG. 14 is that the movable display units 1414 that have one or more edges that are directly adjacent to the display frame may, if third display panels 1448 are used, omit such third display panels 1448 on the sides of the movable display units 1414 that are directly adjacent to the display frame, as is shown for the two outermost movable display units 1414. Third display panels 1448 would never be visible in such display-frame-adjacent locations since the edge-located movable display units 1414 are not capable of extending beyond the display frame and cannot expose the sides of the movable display units 1414 that are adjacent to the display frame.

Figure 15:
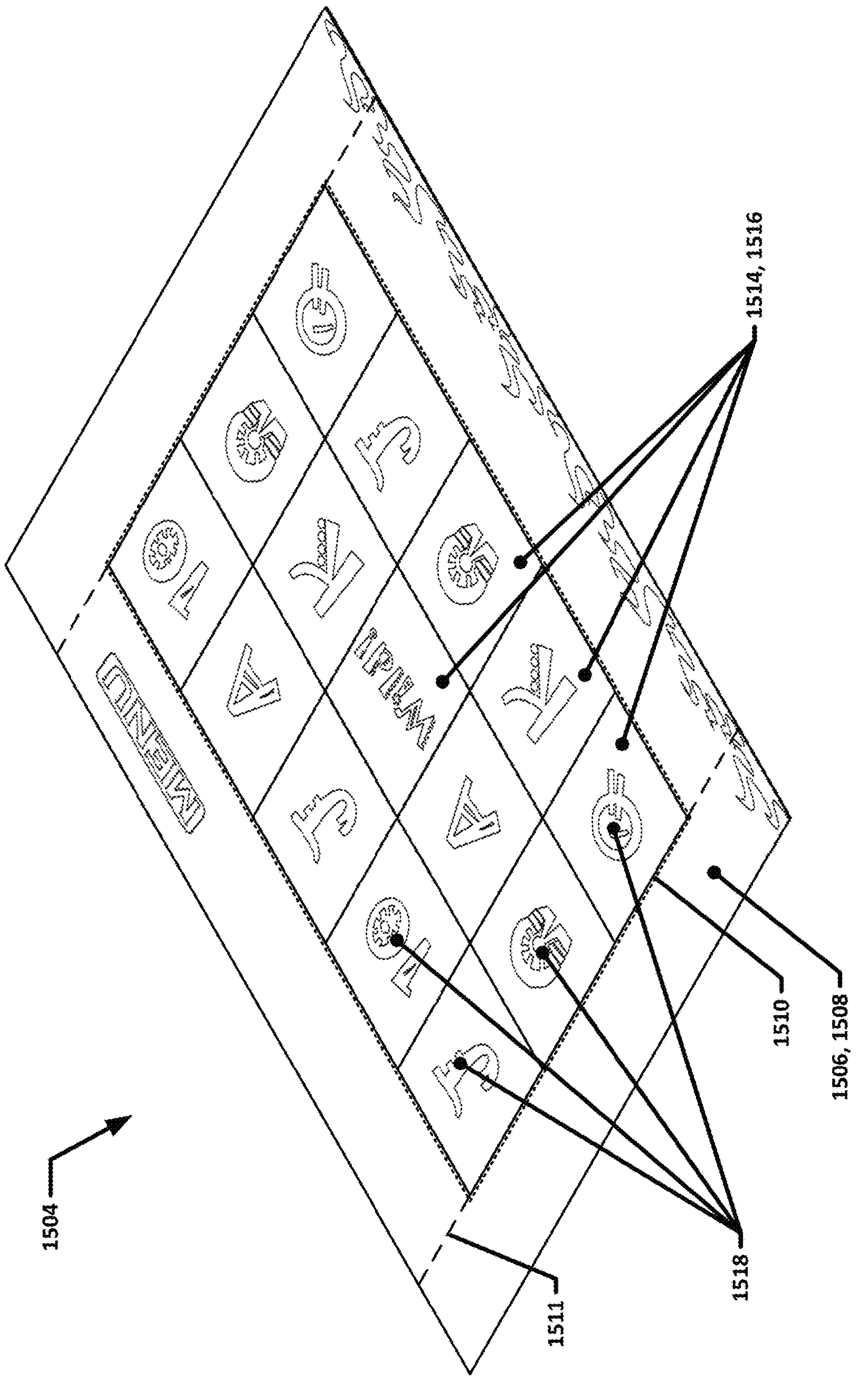
FIGS. 15 through 17 depict a perspective view of the exterior surfaces of an example dynamic display.
Figure 16:
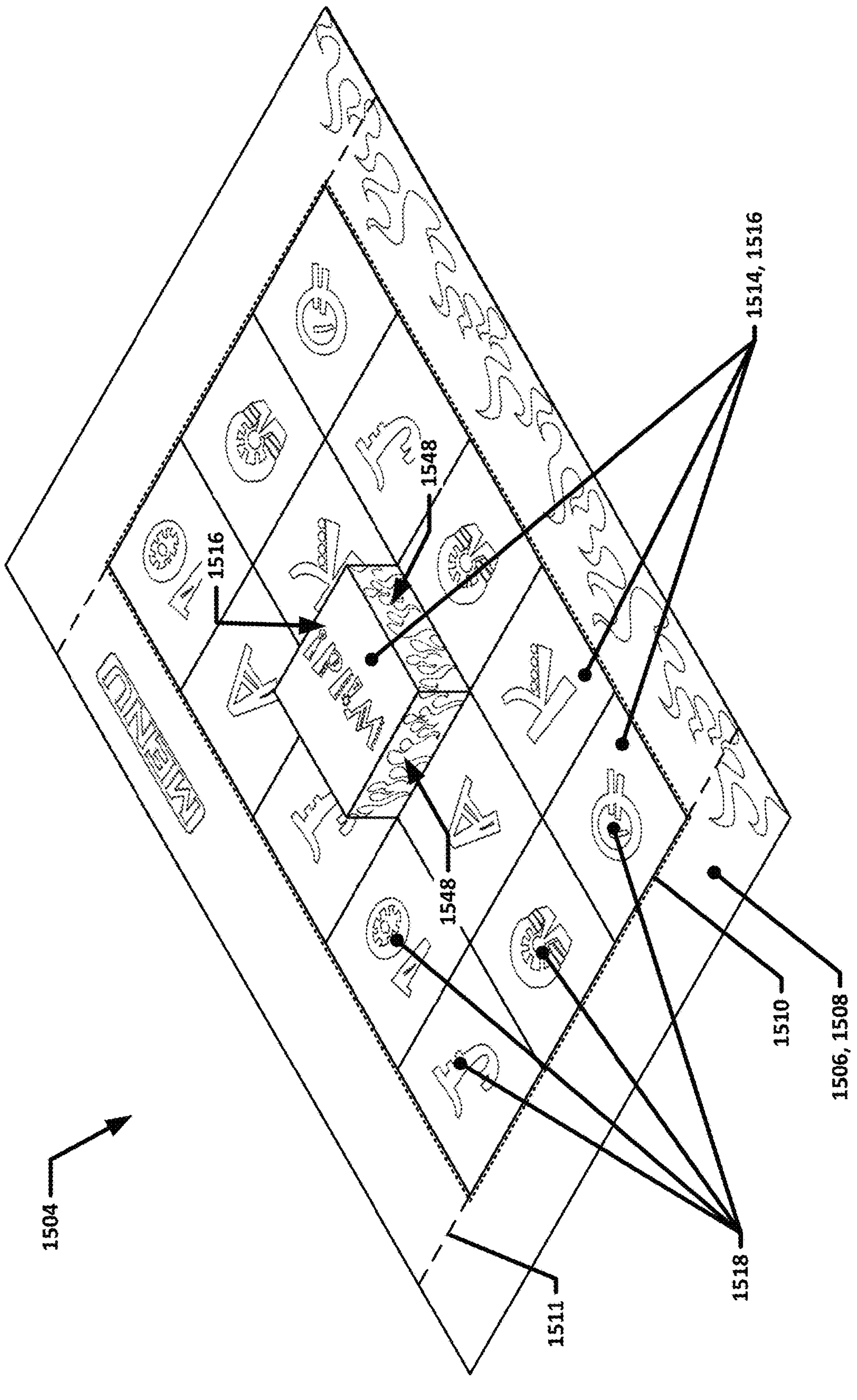
Figure 17:
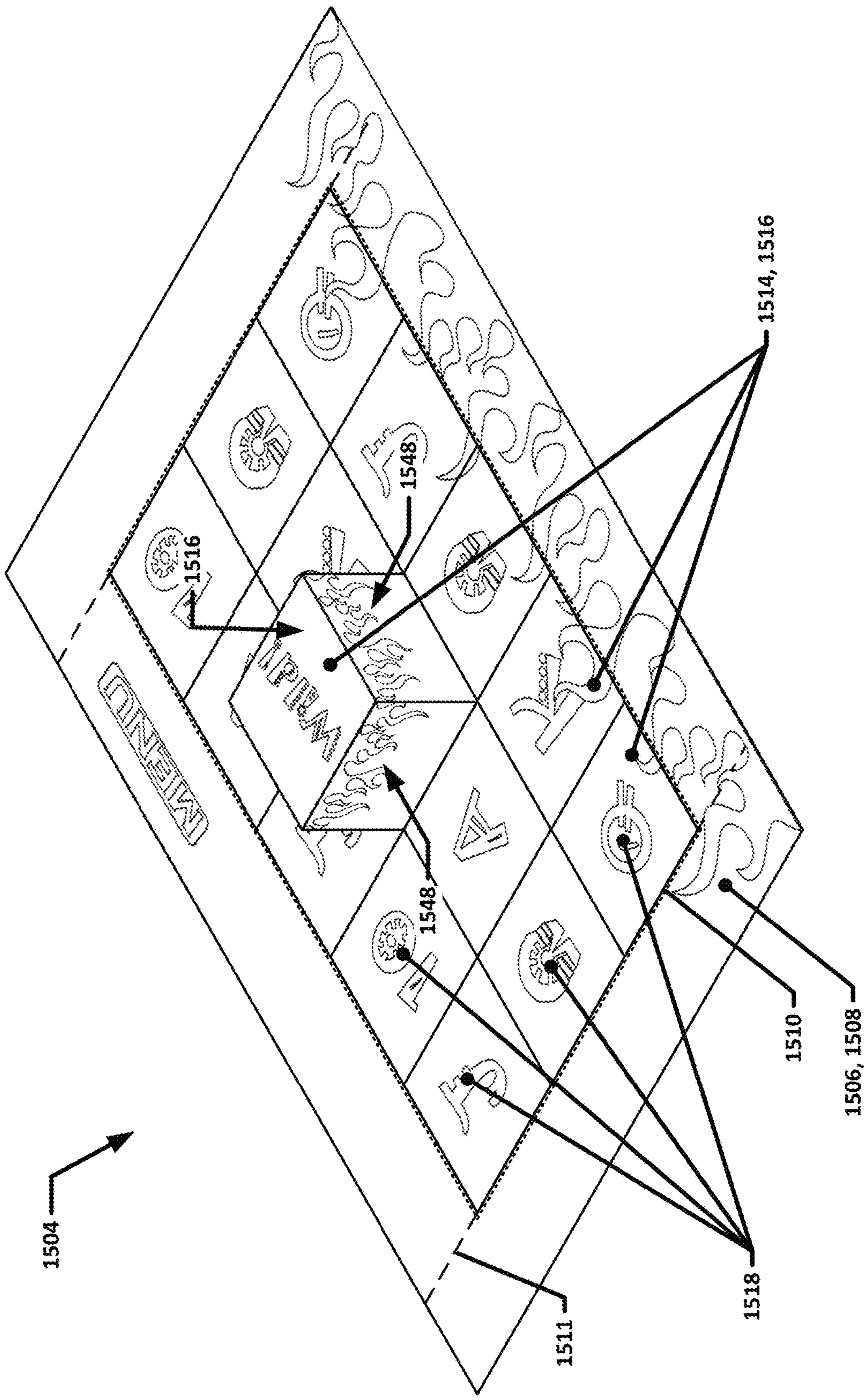

FIGS. 15 through 17 depict a perspective view of the exterior surfaces of an example dynamic display. In FIG. 15, the center movable display unit 1514 with a second display panel 1516 has a "Wild" indicator displayed on it, which may provide a special in-game effect, such as being able to stand in for any symbol that might provide a winning outcome. To further highlight the "Wild" indicator, the movable display unit 1514 displaying the "Wild" indicator may be controlled to rise up proud of the display frame 1506, as shown in FIGS. 16 and 17 (alternatively, such a movable display unit may instead be retracted into the display to differentiate it from the surrounding movable display units displaying non-Wild content). As can be seen, when the movable display unit 1514 stands proud of the surrounding movable display units 1514, the third display panels 1548 located on the side panels of the extended movable display unit 1514 are visible. In this example, a graphic or animation of flames is caused to be depicted on the third display panels 1548, giving the impression that the "Wild" is "hot" or "on fire." Additionally, the first display panel (which may, alternately, be four thin display panel strips, as indicated by the dashed display panel seams 1511) 1508 may display a graphic or animation—in this case, an animation of flames—that grows in size and spills over onto the second displays 1516 that are adjacent to the bottom of the dynamic display 1504.

In some implementations, the third display panels 1548 of such an implementation may be instead be replaced with an illumination device, e.g., a light pipe or other light-transmissive structure connected with one or more light-emitting diodes (LEDs) or other light sources, a layer of electroluminescent material, or other electrically controllable material or structure that can be controlled by game controller 1528 to produce certain lighting effects in response to receipt of a control signal.

Figure 18:
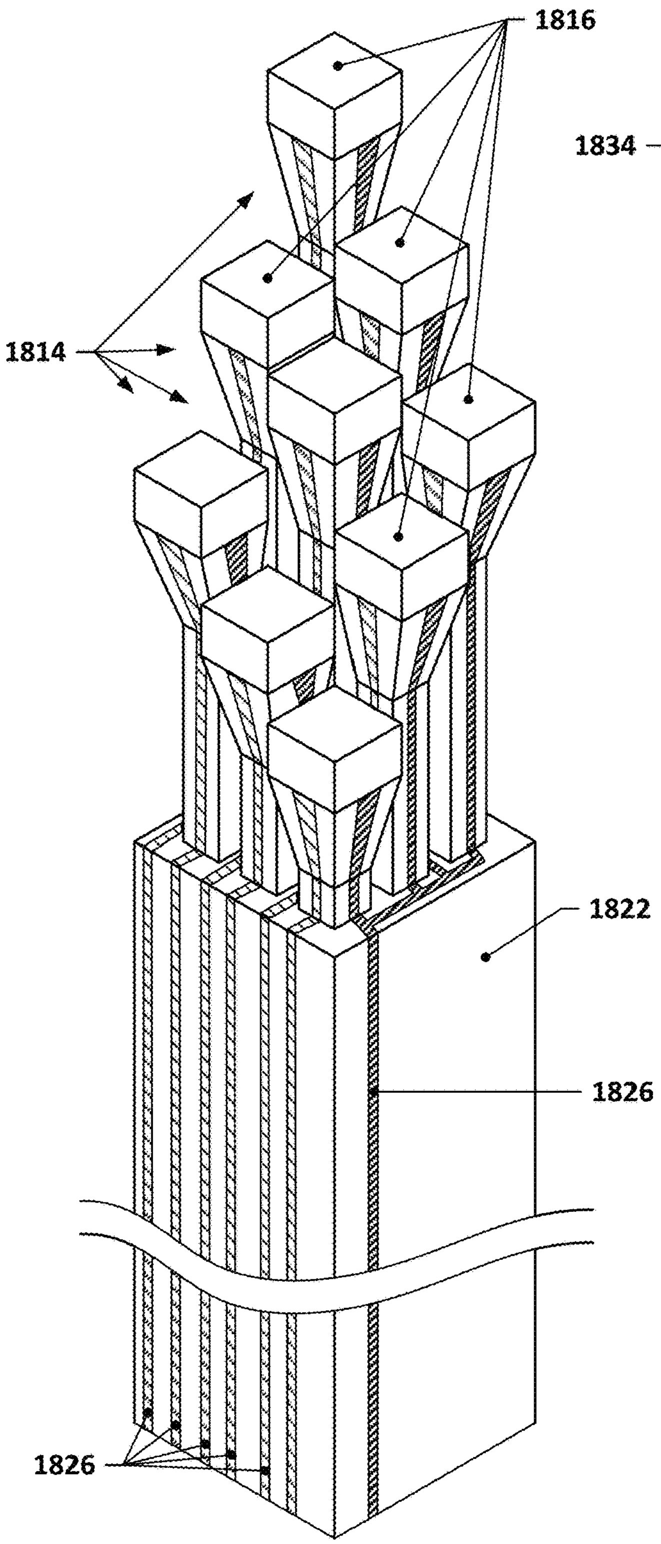
FIG. 18 depicts an example configuration of movable display units featuring single-pixel second display panels.

FIG. 18 depicts an example configuration of movable display units featuring single-pixel second display panels. In FIG. 18, an assembly is shown that features nine separate movable display units 1814 that share a common support structure 1822. The support structure 1822, in this example, includes a 3×3 array of square guide holes, each of which is used to constrain movement of one of the movable display units 1814 to primarily linear translation along the long axis of the assembly. Each movable display unit 1814 may include a single-pixel second display panel 1816, e.g., a single LED or a triplet of red, green, blue LEDs that may be selectively activated to produce a wide range of different colors.

In this example, the second display panels 1816 are approximately 1.5 mm on a side (when viewed along their translation axes), and the 3×3 array of movable display units 1814 may occupy a 4.5 mm square region. Such pixel sizes are somewhat on the large size for many display devices, but are still sufficiently small that the resolution of such displays may be acceptable for use in electronic gaming machines.

As can be seen in FIG. 18, each second display panel 1816 may be supported by an understructure 1834 that is located at the end of a riser 1882 or other structure. In this example, the riser 1882 and the understructure 1834 are an integral, unitary piece, although other implementations may feature a different construction. The understructures 1834 in this example implementation perform several functions. One such function is to transition between the larger sized second display panels 1816 and the smaller sized risers 1882, which allows the second display panels 1816 provide a nearly continuous surface when at the same elevation while allowing the support structure 1822 to have sufficient room to provide the square guide holes. Another function of the understructures 1834 is to provide a sloped surface that may minimize or prevent binding/catching when two adjacent movable display units 1814 are actuated so as to have their second display panels 1816 slide past one another. By having sloped side surfaces, the understructures 1834 may cause any second display panels 1816 with which they come into contact with to be urged outwards, thereby preventing catching/interference between two second display panels. In such arrangements, the understructure 1834 may be the same size or slightly larger than the second display panel 1816 when viewed along the translation axis. A third function provided by the understructures 1834 is to provide different lateral offsets between the centers of the second display panels 1816 and the centers of the actuator rods 1884 and/or the centers of the risers 1882 depending on the relative locations of the movable display units 1814. This is discussed in more detail with respect to FIG. 20 later in this discussion.

Since each second display panel 1816 may include only a single LED or a small number, e.g., three, of LEDs, electrical signals delivered to each second display panel 1816 may only require a small number of electrical traces, e.g., two to four electrically conductive traces per movable display unit 1814. In this example, each second display panel 1816 is provided with two electrically conductive traces 1826 that extend from the second display panel 1816 down along the length of the riser 1882. Corresponding electrically conductive traces 1826 may also be included on the support structure 1822 such that each electrically conductive trace 1826 in the support structure 1822 is in sliding contact with a corresponding electrically conductive trace 1826 of a corresponding riser 1882. Thus, when a riser 1882 translates in and out of the corresponding hole in the support structure 1822, the second display panel 1816 supported by that riser 1882 may stay electrically connected with the electrically conductive traces 1826 of the support structure 1822, thereby allowing the illumination of the second display panel 1816 to be maintained during such movement without interruption. Given the potentially small size of such assemblies, such an arrangement may be much more economical and easier to package than using discrete cables attached to each second display panel 1816. In some implementations, assemblies of movable display units 1814 such as are shown in FIG. 18 may be modular and configured to be inserted into a modular backplane that includes arrays of electrical connections that make electrical contact with the electrically conductive traces 1826 when each assembly is inserted or installed into the backplane, thereby allowing for modular and scalable assemblies to suit any of a variety of different dynamic display sizes.

Figure 19:
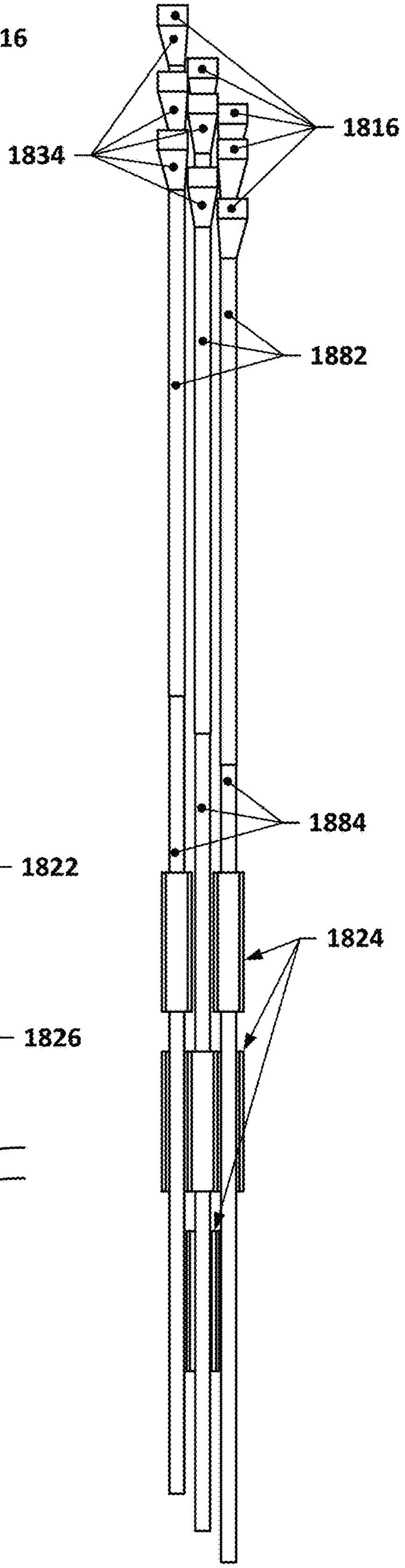
FIG. 19 depicts the example assembly of FIG. 18 with the support structure removed.
Figure 21:
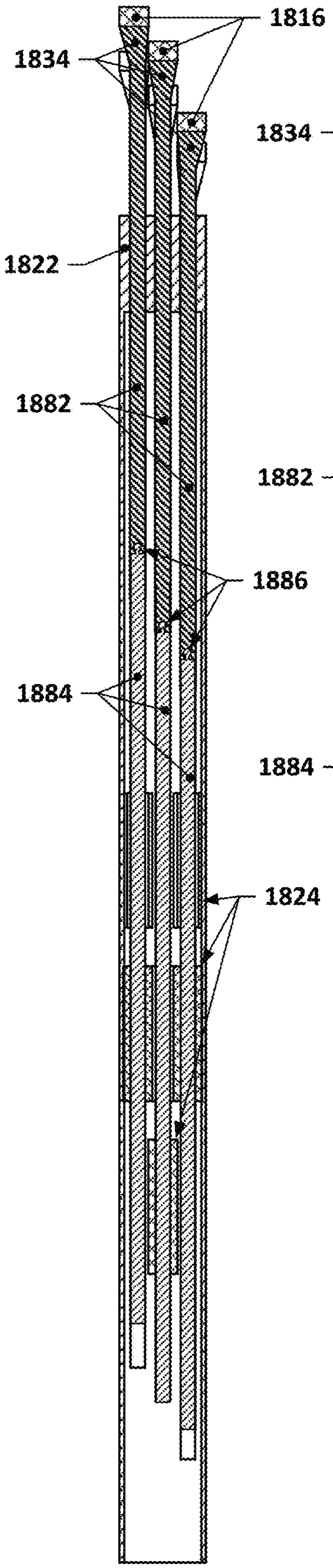
FIG. 21 shows a cutaway view of the assembly of FIG. 18.

FIG. 19 depicts the example assembly of FIG. 18 with the support structure removed. As can be seen, each riser 1882 is connected with a linear drive mechanism 1824. In this example, the linear drive mechanisms 1824 may be miniature linear screw drives that have an actuator rod 1884 that may be caused to extend/retract at a variety of speeds responsive to actuation of the linear drive mechanisms 1824. Since the actuator rod 1884 rotates during extension, the connection between the actuator rods 1884 and the risers 1882 may be established to permit such rotation while keeping the risers 1882 from rotating. For example, the tips of the actuator rods 1884 may terminate in small spheres or other suitable shapes that may "snap" into corresponding receptacles on the ends of the risers 1882 so that the two components are joined together for the purposes of axial translation but are free to rotate relative to one another about the axis of that axial translation. Such a feature is shown in FIG. 21, which shows a cutaway view of the assembly of FIG. 18.

The linear drive mechanisms 1824 of the present example may, for example, be piezoelectrically driven ultrasonic lead screws, such as are described in U.S. Pat. No. 6,940,209, which is hereby incorporated herein by reference in its entirety. Such lead screw actuators may be exceedingly small, e.g., having outer dimensions in planes perpendicular to the extension axis thereof on the order of 1.5 mm, with actuator rods having diameters of 0.75 mm. Even with the small size of such linear drive mechanisms 1824, it may be desirable to stagger some of the linear drive mechanisms 1824 relative to one another to allow for more condensed packaging and thus higher resolution dynamic displays.

Figure 22:
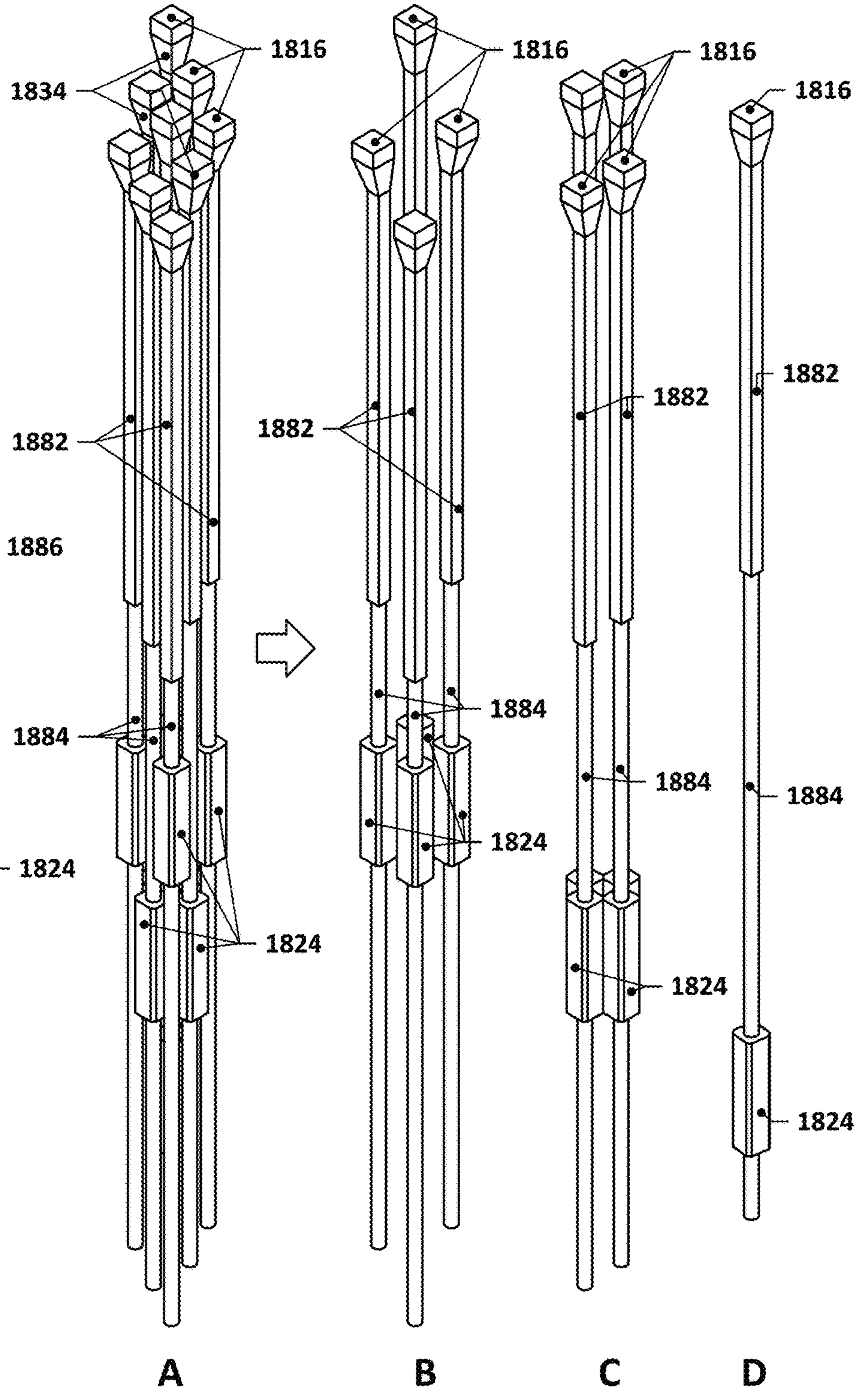
FIG. 22 shows the example assembly of FIG. 18 with the support structure removed and various different subgroupings of components.

For example, in FIG. 19, it can be seen that the stationary portions of the linear drive mechanisms 1824 (not the actuator rods 1884) have been arranged into three groups that are staggered relative to each other along the extension axes of the linear drive mechanisms 1824. In this example, there are two groups of four linear drive mechanisms 1824, and a third ground consisting of a single linear drive mechanism 1824. This allows the housings of the linear drive mechanisms 1824 of adjacently-located movable display units 1814 to overlap each other when viewed along the linear extension axes thereof. Generally speaking, the linear drive mechanisms 1824 for an assembly such as is shown may be arranged in groups such that no group includes linear drive mechanisms 1824 for two edge-to-edge-adjacent movable display units 1814. The actuator rods 1884 may extend through the gaps between the edges of the linear drive mechanisms 1824 in the various groups. This is more clearly shown in FIGS. 22A through 22D. In FIG. 22A, the example assembly of FIG. 18 is shown with the support structure 1822 removed in view A. Views B, C, and D show each group of movable display units 1814 and the respective linear drive mechanisms 1824 for each group. As can be seen, the actuation rods 1884 for each linear drive mechanism 1824 may extend through the interstices between the linear drive mechanisms 1824 in each group, thereby allowing for a more compact arrangement of the linear drive mechanisms 1824 in the plane that is perpendicular to the extension axes thereof at the expense of increased depth required along the extension axes to house all of the linear drive mechanisms 1824. In the example provided, each movable display unit 1814 may be caused to extend or retract approximately 0.5 inches, although it will be recognized that since the linear drive mechanisms 724 that are used are lead screw drive mechanisms, additional travel can be obtained merely through the lengthening of the actuator rods 784 (which, in this example, are the lead screws and would thus be threaded; for simplicity of illustration, the threading is not shown in the Figures).

Figure 20:
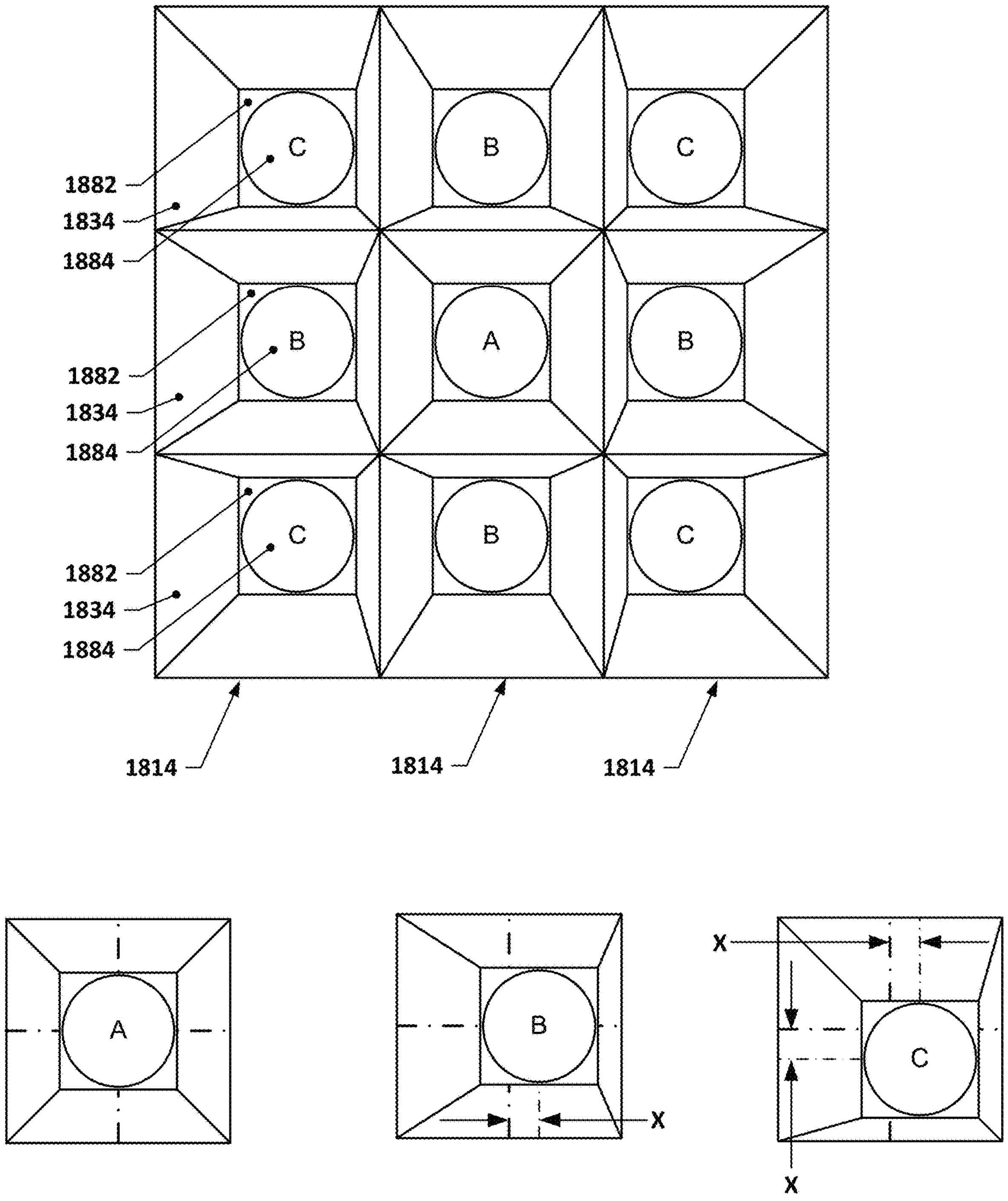
FIG. 20 depicts a bottom view of the movable display units of FIG. 18.

FIG. 20 depicts a bottom view of the movable display units of FIG. 18. As can be seen, the nine movable display units 1814 shown come in three distinct types—a single center movable display unit "A," four edge movable display units "B," and four corner movable display units "C" (these are arranged in different orientations, but otherwise have similar geometries). In this example, there are only nine movable display units 1814, but it will be understood that more or fewer quantities of movable display units 1814 may be used in other similar assemblies, in which case the number of each type of movable display unit may vary. For example, if only four movable display units are included in each assembly or subassembly, then there may be no edge or center movable display units and all of the movable display units may be corner-type units. Similarly, if there are 4×4 movable display units, there may be eight "edge" movable display units and four "center" movable display units.

To facilitate having the linear drive mechanisms 1824 be completely "in the shadow" of the second display panels 1816 when viewed along the translation axes thereof, the understructures 1834 may be designed so that the centers of the second display panels 1816 are sometimes offset from the centers of the risers 1882 and/or actuation rods 1884, as mentioned earlier. In this example, the center movable display unit 1814 "A" has a riser 1882 that is centered on the second display panel 1816, the edge movable display units 1814 "B" have risers that have center axes that are offset by distance X, e.g., 0.2 mm (as compared with a 1.5 mm square second display panel 1816), from the center of the second display panel 1816 in one direction, and the corner movable display units 1814 "C" have risers 1882 that have center axes that are offset from the center of the second display panel 1816 by distance X in two orthogonal directions. Such offsets may provide room to package the respective linear drive mechanisms 1824 for each movable display unit 1814 while still providing adequate room for the support structure 1822 around the movable display units 1814 and the linear drive mechanisms 1824. The amount of offset used may vary depending on the size of the assembly, the second display panels, and the linear drive mechanisms, and some implementations may feature differing amounts of offsets between corner, edge, and center movable display units. For example, in some implementations, there may be multiple "edge" movable display units with different amounts of such offsets.

Figure 23:
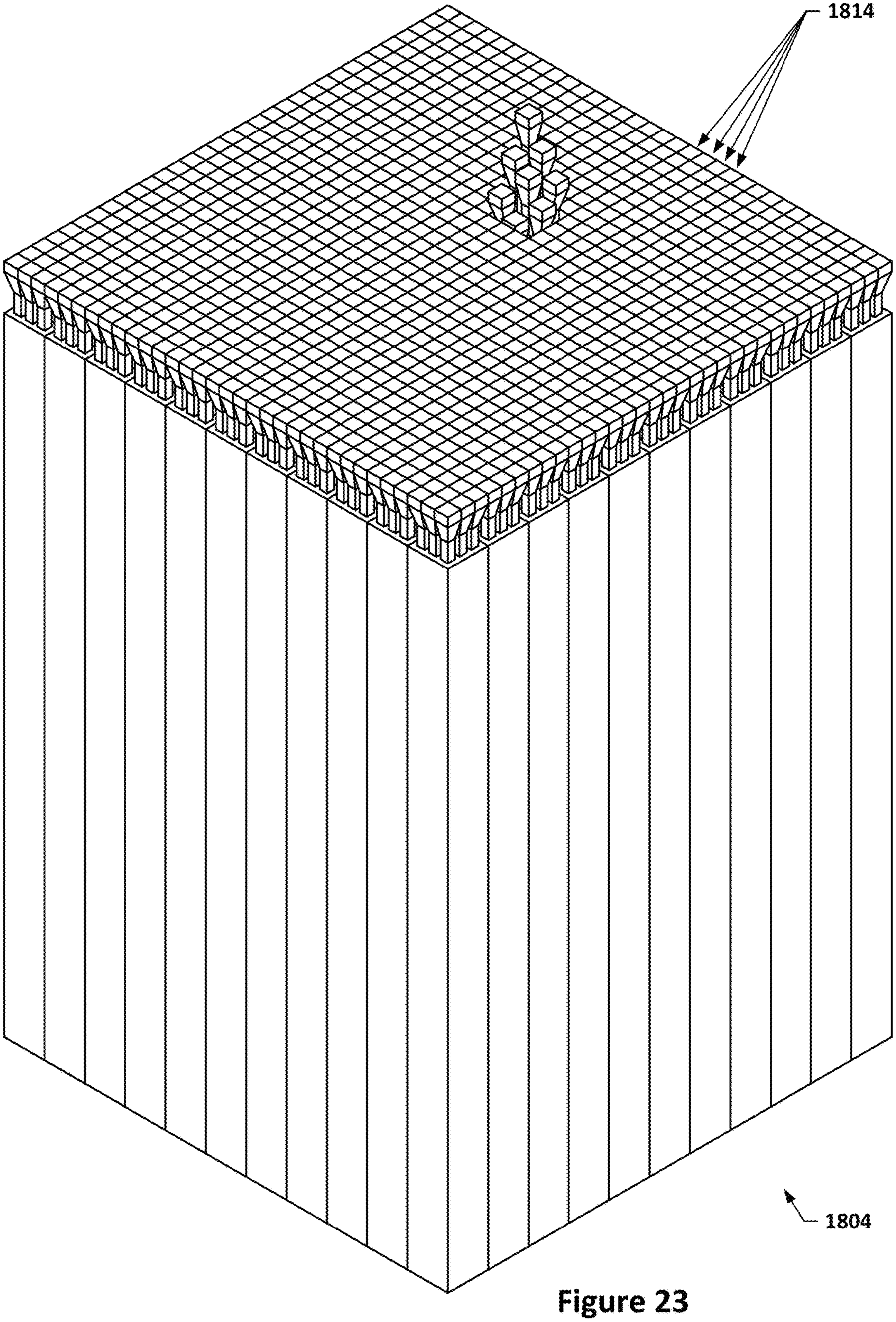
FIG. 23 depicts an example dynamic display panel using the assembly of FIG. 18.

FIG. 23 is an example of an 11×11 array of the movable display unit assembly shown in FIG. 18; most of the movable display units in the array are actuated so as to be at the same elevation, but the movable display units in one such assembly are shown in various extended states. Such an array may form a dynamic display 1804, and may be scaled larger or smaller as necessary.

FIGS. 24 through 27 depict an example dynamic display in which the movable display units include movable side panels; the side panels are shown in various states of deployment in these Figures. In FIGS. 24 through 27, each movable display unit 2414 includes side panels 2438 that are movably mounted with respect to a second display panel 2416 and platform 2436 by way of mechanism, e.g., hinges 2462. Each movable display unit 2414 may also include an actuation mechanism 2456 (in this case, a linear actuator that drives a piston 2458 in and out) that may be used to cause the side panels 2438 of that movable display unit 2414 to transition between different configurations including a first configuration and a second configuration.

Figure 24:
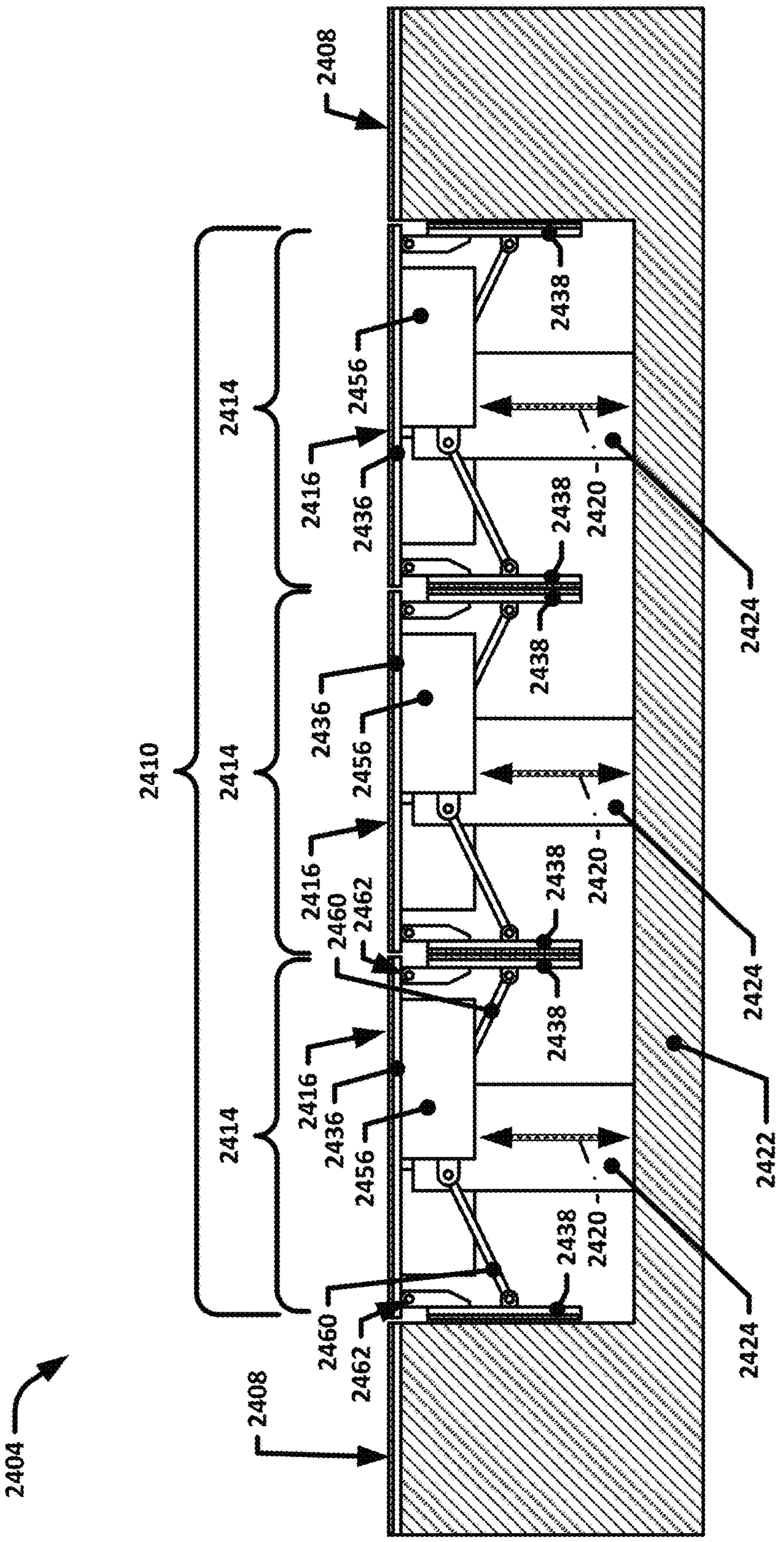
FIGS. 24 through 27 depict an example dynamic display in which the movable display units include movable side panels; the side panels are shown in various states of deployment in these Figures.
Figure 25:
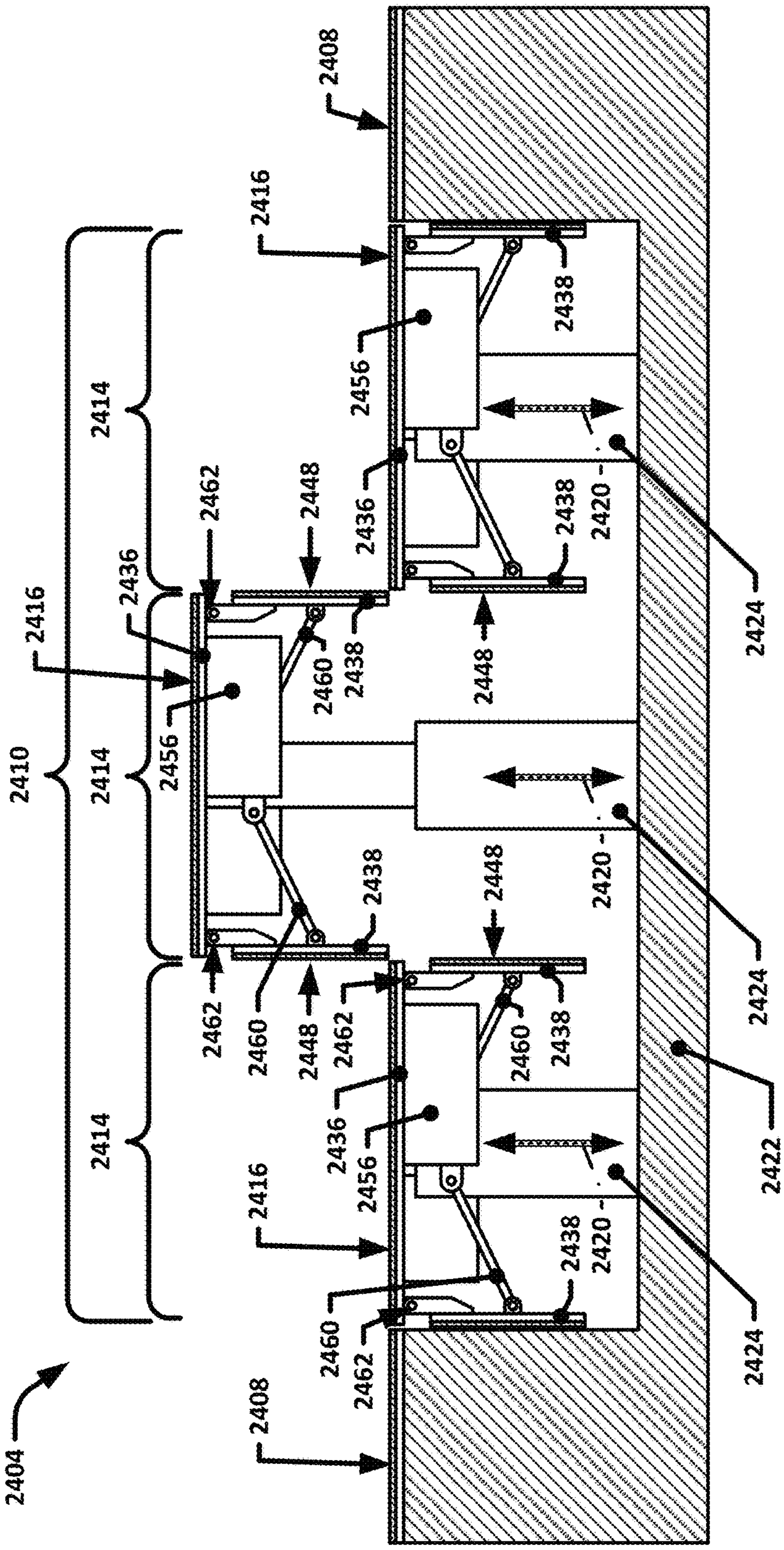
Figure 26:
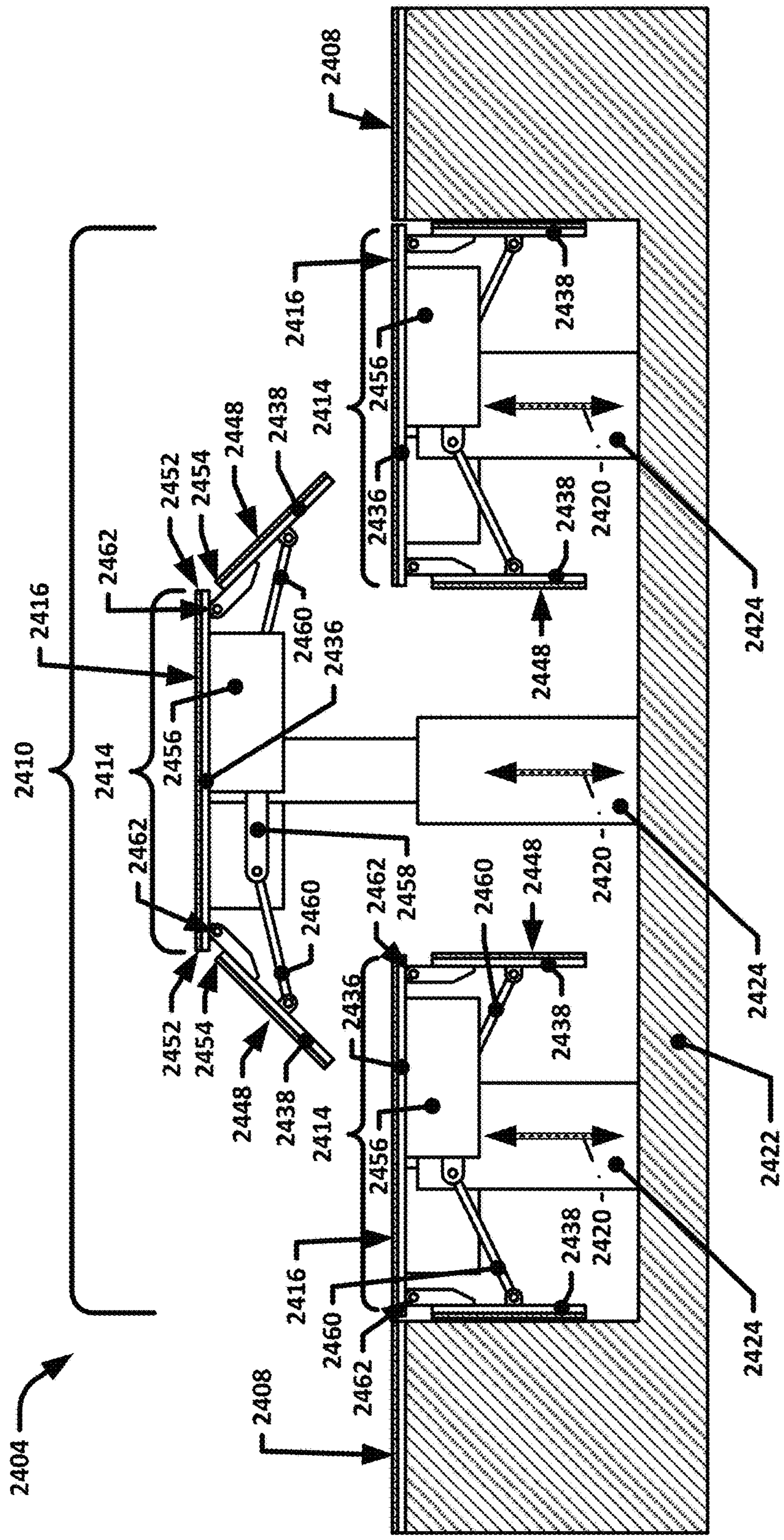
Figure 27:
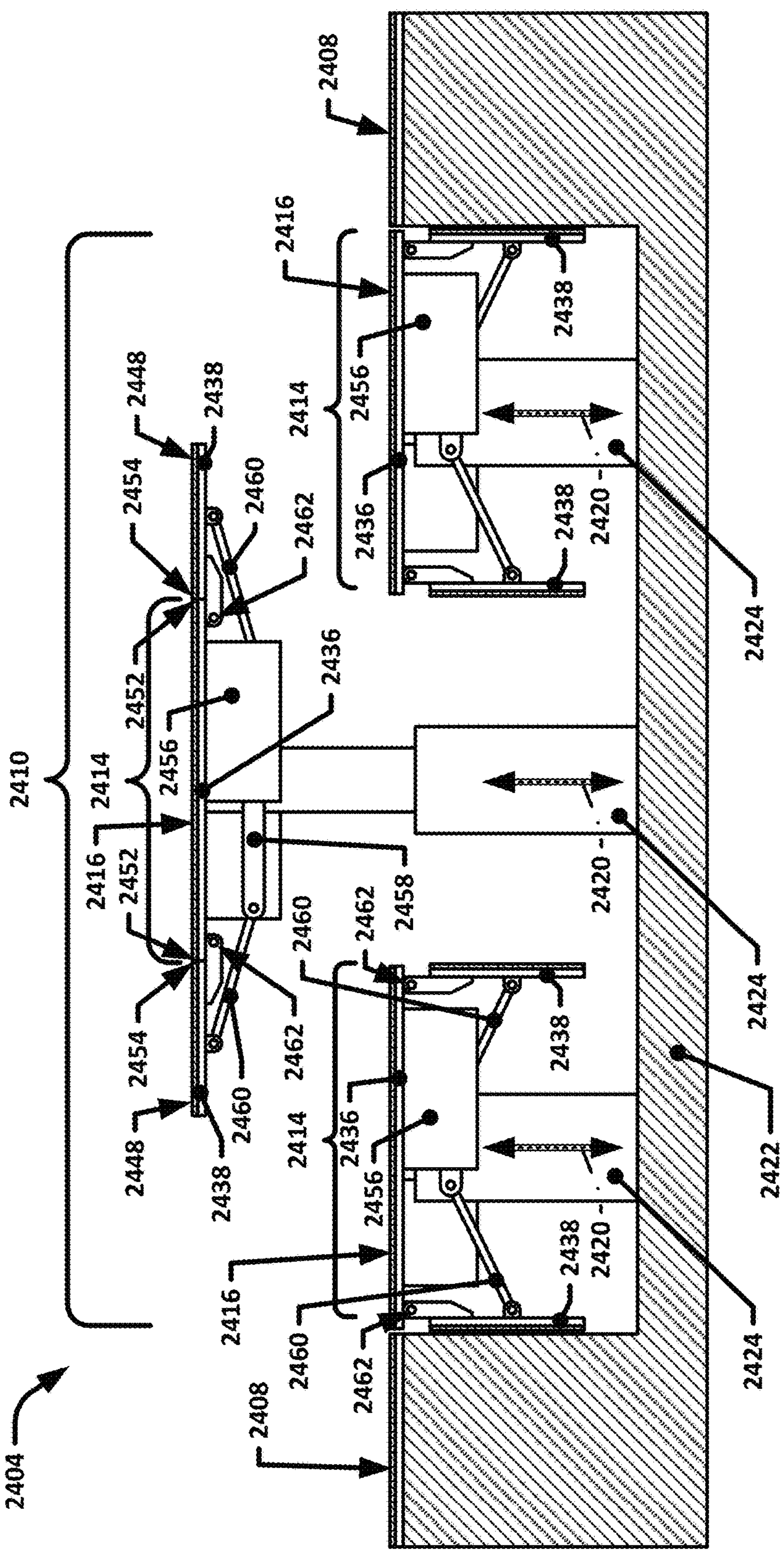

In the first configuration, the side panels 2438 of a movable display unit 2414 may be positioned behind the second display panel 2416 of the movable display unit 2414 when viewed along the first axis 2420 with the linear drive mechanism 2424 of the corresponding movable display unit 2414 located behind the second display panel 2416, as shown for all of the movable display units 2414 in FIGS. 24 and 25 and for the two outer movable display units 2414 in FIGS. 26 and 27. In such a configuration, the footprint of the movable display unit 2414 may be constrained to generally be the same size as the second display panel 2416 of that movable display unit 2414 when viewed along the associated first axis 2420.

In the second configuration, the side panels 2438 of the movable display unit 2414 may be positioned such that a major surface of each side panel 2438 is positioned with an edge 2454 proximate to one of the edges 2452 of the second display panel 2416 of the corresponding movable display unit 2414 and such that the major surface is substantially parallel with the second display panel 2408 of the corresponding movable display unit 2414, e.g., as shown for the middle movable display unit 2414 in FIG. 27.

In the depicted implementation, each actuation mechanism 2456 is a piston-type actuator that, when actuated, causes the associated piston 2458 to extend from the housing of the actuation mechanism 2456. The piston 2458 may be connected with a respective side panel 2438 by way of a link 2460 that is pivotally connected with the piston 2458 and the respective side panel 2438 at each end so as to cause the side panel 2438 to rotate about the rotational axis of the hinge 2462 to which it is attached and into the second configuration when the actuation mechanism 2456 is actuated. FIG. 26 depicts the actuation mechanisms 2456 in a semi-deployed state, and the side panels 2438 halfway transitioned between the first configuration and the second configuration.

It will be recognized that other types of mechanisms aside from the depicted hinge/piston/link mechanism may be used as well, and this disclosure is to be understood to include implementations where a different mechanism is used to transition the side panels between the first and second configurations. For example, more complex linkages, such as four-bar linkages, may be used, as well as other types of actuators, e.g., rotary actuators. In some implementations, the side panels 2438 for a movable display unit 2414 may be driven by a common actuation mechanism 2456 that causes all of the side panels 2438 to move in unison. In other implementations, however, each side panel 2438 of a movable display unit 2414 may be provided with its own actuation mechanism 2456 so as to allow each side panel 2438 to be transitioned between the first and second configurations independently. Such implementations may be useful when the side panels 2438 of two adjacent movable display units 2414 that are at the same elevation are to be actuated—the side panels 2438 that are adjacent may not be able to be actuated into the second configuration in such circumstances since they will collide with each other, potentially causing damage to the system. In such instances, the side panels 2438 that are adjacent may be left unactuated to prevent such an occurrence.

As shown, the side panels 2438 include third display panels 2448 (the cabling/connectors for such display panels are not shown) so that, in the second configuration, the second display panel 2416 and the adjacent third display panels 2448 may form a generally contiguous display area. It will also be understood, however, that some similar movable display units 2414 may not include third display panels 2448 on the side panels 2438, but may instead include illuminable elements, e.g., electroluminescent panels, large-format LEDs (as opposed to pixel-based LEDs used, for example, in OLED displays), and/or translucent or transparent light pipe features coupled with light sources, in order to provide an illumination effect around the second display panel 2416 of such movable display units 2414. In yet other implementations, the side panels 2438 may not include any illuminable elements or third display panels 2448, and may instead simply include static decorations, e.g., silkscreened or printed embellishments or designs, or other decorative patterns.

It will also be understood that a movable display unit may include a combination of different types of side panels. For example, some movable display units may include some side panels that are fixed in place, e.g., similar to the side panels of FIG. 7, and some side panels that are transitionable between first and second configurations, such as side panels 2438. For example, some movable display units may include two transitionable side panels mounted opposite one another, and two static side panels along the edges interposed therebetween.

Various types of linear drive mechanisms may be used to provide the linear translation capability of the movable display units discussed herein. As discussed earlier, solenoids, hydraulic or pneumatic pistons, screw drives, or other types of linear actuator mechanisms may be used. Additionally, some linear drive mechanisms may use a cam mechanism to drive the linear translation capability of the movable display units in some implementations.

Figure 28:
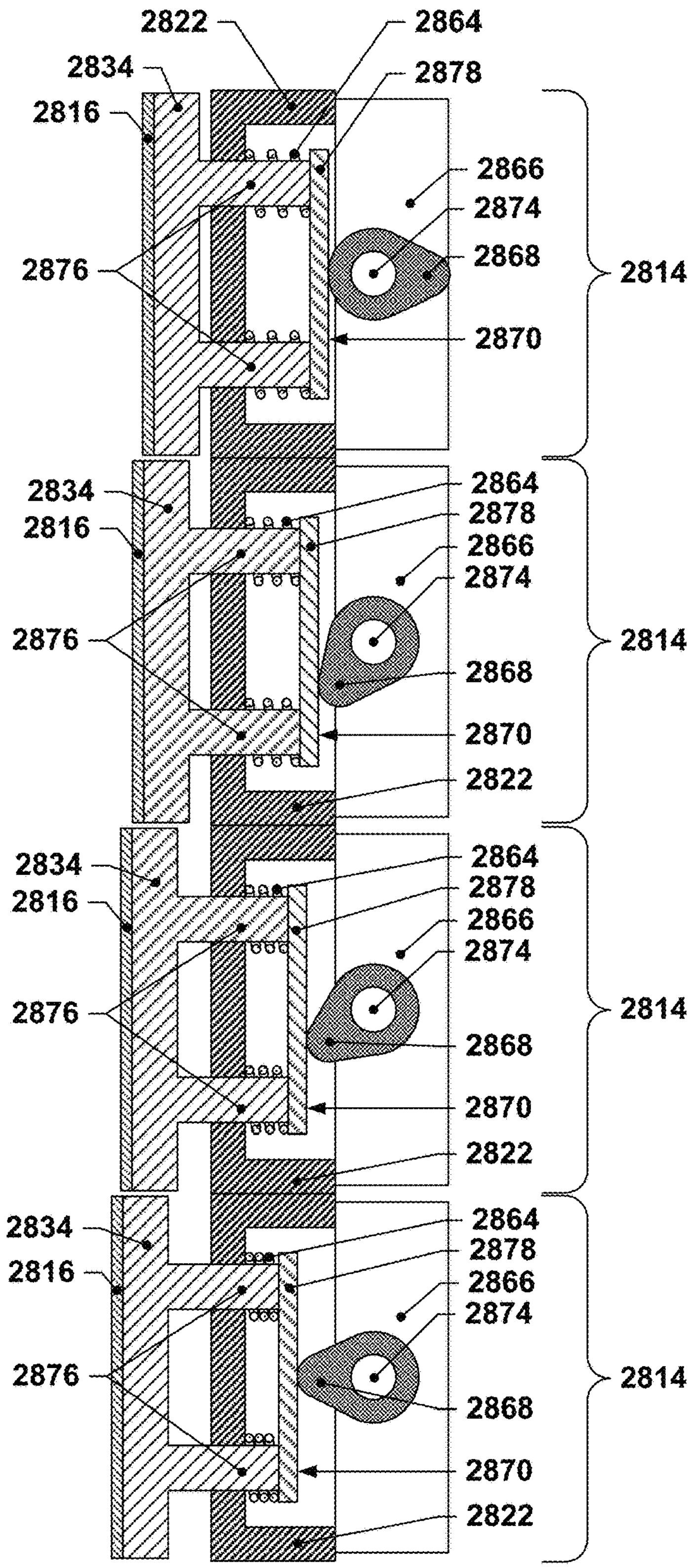
FIG. 28 depicts a side section view of one implementation of example movable display units.

FIG. 28 depicts a side section view of one implementation of example movable display units with a cam-type linear drive mechanism. In FIG. 28, a side view of an array of movable display units 2814 is shown (four are shown, but more or fewer could be used; additionally, a two-dimensional array of movable display units 2814 may be used as well). Each movable display unit 2814 may include a second display panel 2816 that is supported by an understructure 2834 that is configured to slide relative to a support structure 2822, e.g., by linear guides 2876. In this example, the linear guides 2876 are two or more cylindrical rods, although other types of linear guides may be used as well. In this example, the linear guides 2876 are capped by a cap plate 2878 and a pair of springs 2864 are sandwiched between the cap plate 2878 and the support structure 2822, thereby causing the understructure 2834 to be biased towards the support structure 2822. When force is applied to the cap plate 2878 of a movable display unit 2814 and towards the second display panel 2816, this causes the understructure 2834 and the second display panel 2816 of that movable display unit 2814 to actuate and translate the second display panel outwards into an extended position or configuration.

Such actuation force may be provided, for example, by a rotary cam mechanism. For example, the movable display units 2814 may each include a motor 2866 that is fixed in space with respect to the support structure 2822, a driveshaft or camshaft 2874, and a cam 2868. When the motor 2866 is actuated, this may cause the driveshaft or camshaft 2874 to rotate, thereby rotating the cam 2868. As the cam 2868 rotates, it may engage with a cam engagement surface 2870 that is part of the movable portion of the movable display unit 2814. In this example, the cam engagement surface 2870 is the surface of the cap plate 2878 that faces towards the cam 2868. When the cam lobe (the "high" point of the cam, or the portions of the cam that are generally further from the rotational center of the cam than the portions of the cam that are closest to the rotational center of the cam) engages with the cam engagement surface 2870, this causes the cam engagement surface 2870 to be pushed away from the driveshaft or camshaft 2874, thereby providing the force needed to cause the understructure 2834 and the second display panel 2816 to be displaced outwards. When the cam lobe is no longer engaged with the cam engagement surface 2870, the springs 2864 may act to push the cam engagement surface 2870 back into the non-actuated position. In this example, each of the movable display units 2814 has been actuated to a different degree, resulting in the second display panels 2816 being translated outwards by different amounts (the uppermost second display panel 2816 is in an unactuated state due to the positioning of the cam 2868.

Figure 29:
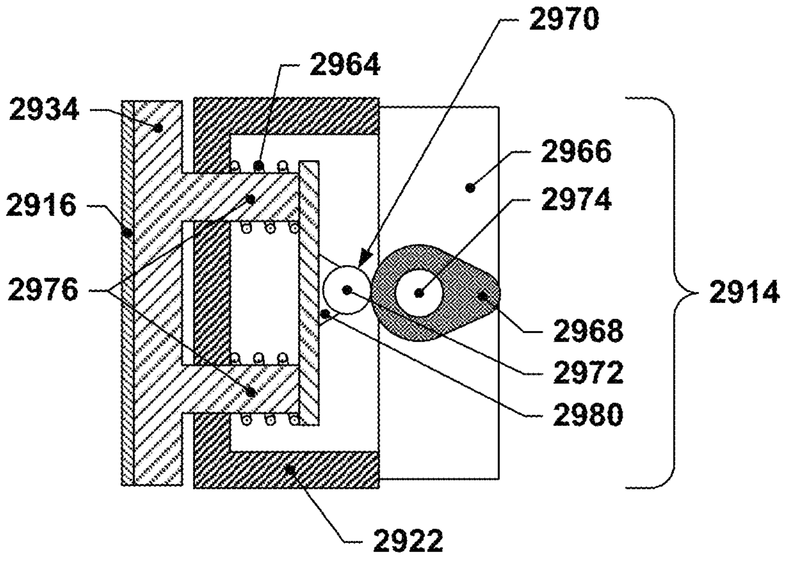
FIG. 29 depicts a side section view of another implementation of an example movable display unit.
Figure 30:
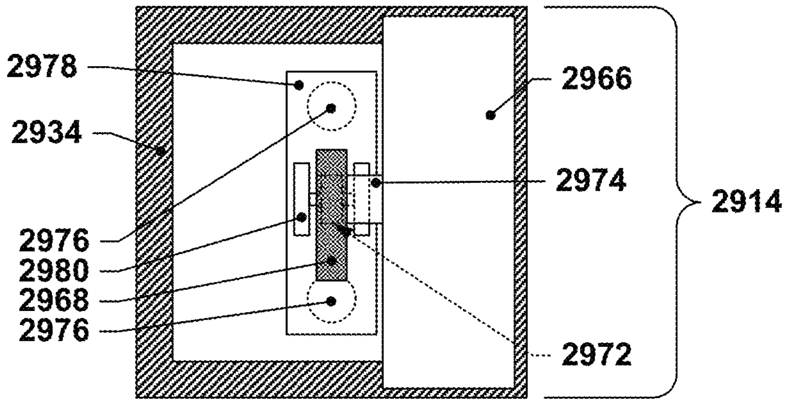
FIG. 30 depicts a rear view of the implementation of the example movable display unit of FIG. 29.

FIG. 29 depicts a side section view of another implementation of an example movable display unit with a cam-driven linear drive mechanism; FIG. 30 depicts a rear view of the implementation of the example movable display unit of FIG. 29. Movable display unit 2914 is similar to those shown in FIG. 28, and reference numbers with the same last two digits are used to indicate components common to both; the descriptions of such components from FIG. 28 are equally applicable to the counterpart components of FIGS. 29 and 30 unless otherwise indicated.

The movable display unit 2914 differs from the movable display unit 2814 in that the cam engagement surface 2970 is provided by a cam follower 2972, which may be rotatably supported by a pillow block 2980 mounted to, supported by, or otherwise fixedly connected with the understructure 2934 and/or the linear guides 2976. The use of the cam follower 2972 may provide a rolling contact surface that may reduce friction and actuation force needed to actuate the movable display unit 2914. The operating principles are similar, however, to those of the implementation of FIG. 28.

Figure 31:
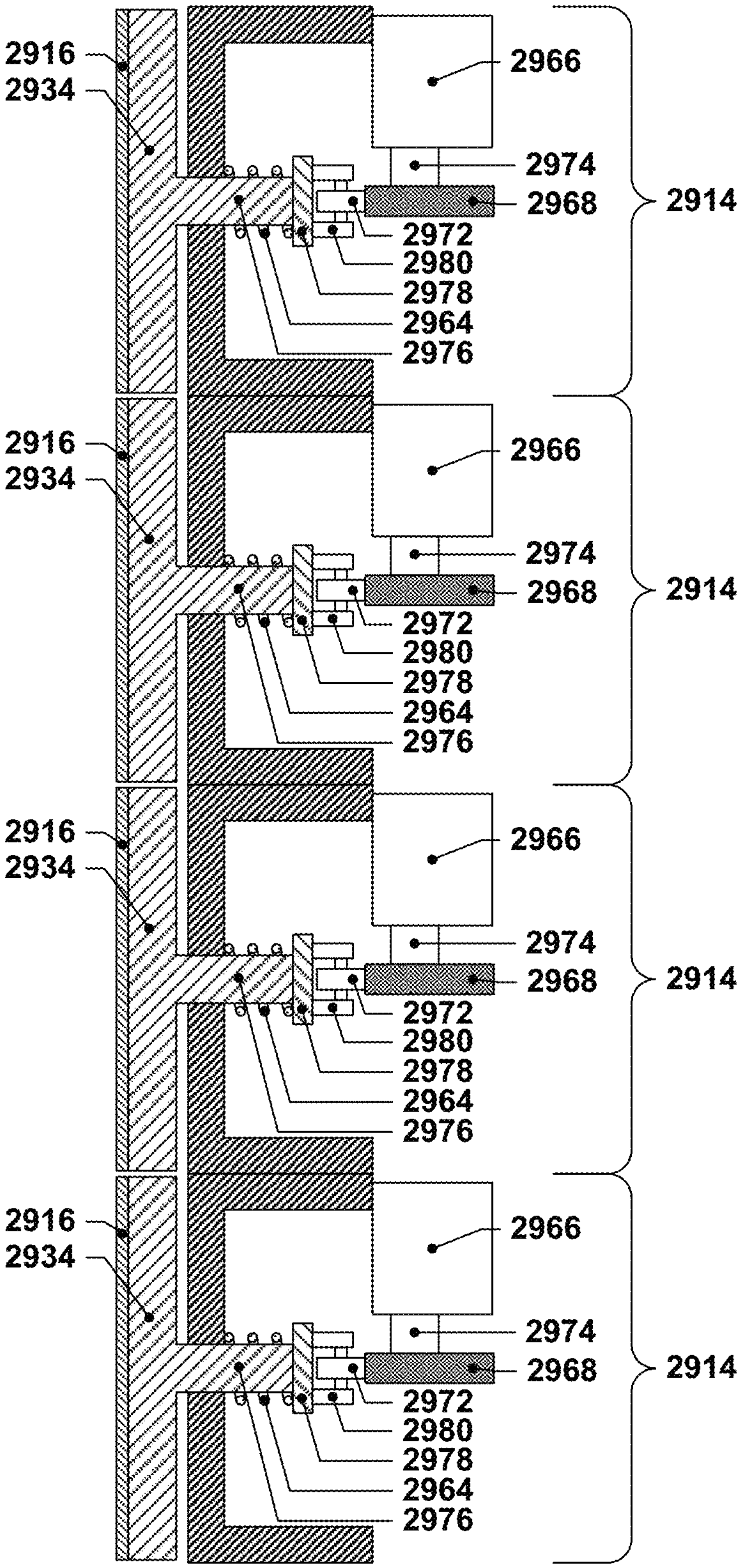
FIG. 31 depicts a side section view of a plurality of the example movable display units of FIGS. 29 and 30 arranged side-by-side.

FIG. 31 depicts a side section view of a plurality of the example movable display units of FIGS. 29 and 30 arranged side-by-side. As can be seen, the movable display units 2914 may be ganged together in a manner similar to that shown for the implementation of FIG. 28. It will be generally evident that dynamic display units using movable display units may be manufactured in a modular fashion, or as a device with a non-modular support structure. If built in a modular fashion, one or more movable display units may be housed in a single unit, with a common support structure that may be joined to adjacent support structure(s) of other movable display units—this may allow for easy assembly of custom-sized displays and may facilitate repairs if a movable display unit fails (the failed unit may be removed and replaced with an operable unit).

Figure 32:
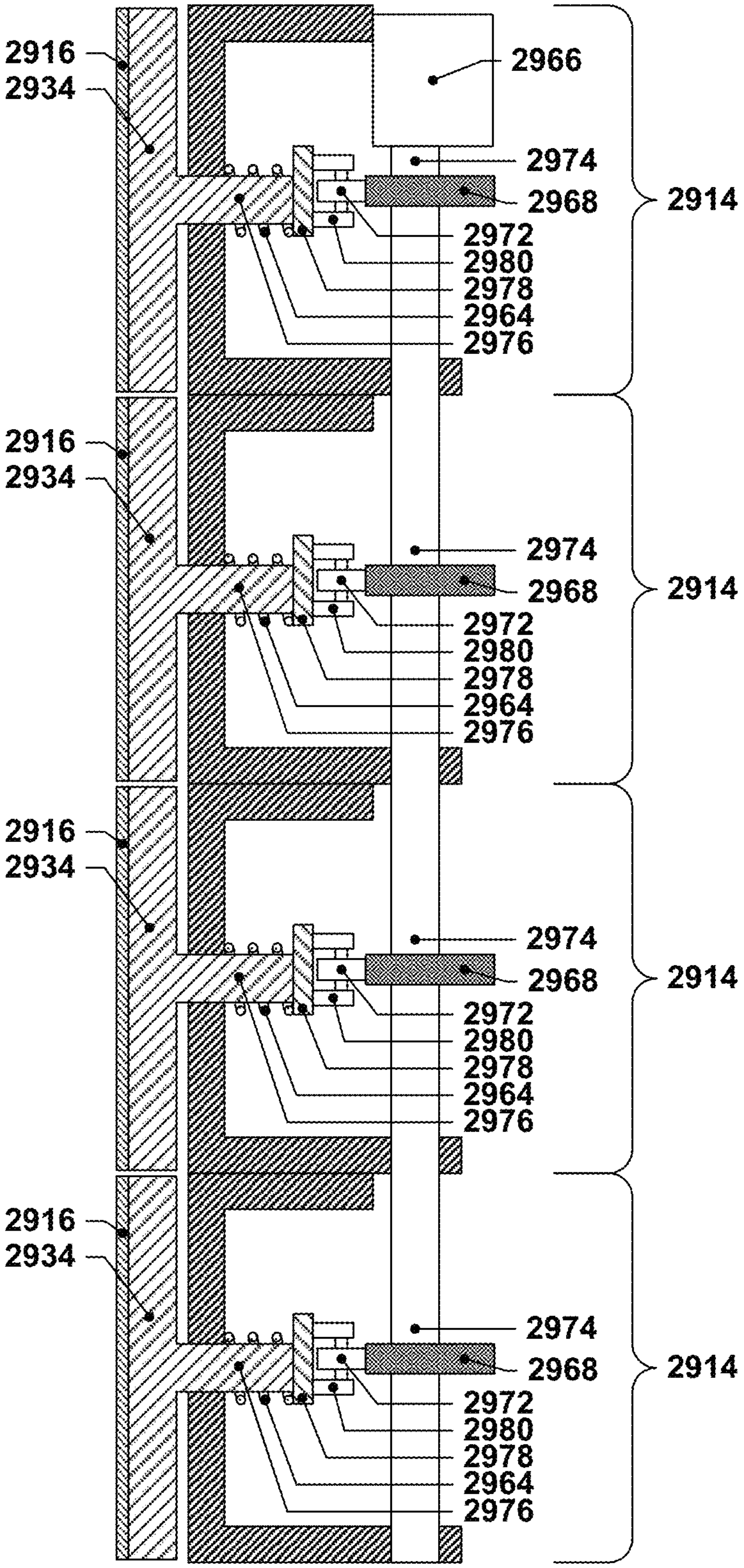
FIG. 32 depicts a side section view of another example of a plurality of example movable display units arranged side-by-side.

FIG. 32 depicts a side section view of another example of a plurality of example movable display units arranged side-by-side. In FIG. 32, the movable display units 2914 have cam-equipped linear drive mechanisms that are all connected with a common driveshaft or camshaft 2974. In such an example, the actuation of the movable display units 2914 may be "fixed" in that for any given rotational position of the driveshaft or camshaft 2974, there is one and only one corresponding position of each understructure 2934 and second display panel 2916. If a dynamic display is intended to be controlled to show "linear" effects, e.g., to cause the movable display units to actuate in a "wave" that travels across the display, then such commonly driven actuation systems may be used and may avoid the need for separate linear drive mechanisms (or at least multiple motors therefore), thereby driving down cost.

For example, if five of the arrangements shown in FIG. 32 were placed side-by-side with the driveshafts or camshafts 2974 spaced apart from one another along a direction perpendicular to their rotational axes, then each motor 2966 could be actuated for a full revolution and at the same speed but with different angular starting positions (or different start times) to produce a wave that travels across the display. If desired, the cams 2968 mounted to each driveshaft or camshaft 2974 may also be mounted out of phase with one another so as to produce a "pulse" effect that travels in a direction parallel to the rotational axis of the driveshaft or camshaft 2974. For example, each cam 2968 mounted to a driveshaft or camshaft 2974 may be positioned at an X° offset from the angular orientation of the adjacent cam 2968.

It will also be recognized that the movable display units discussed herein may also be used in implementations that lack a display frame, e.g., where there are no "fixed" display portions surrounding the movable display units. In such instances, there may effectively be no "first display panels." In view of this, the claims may utilize a different convention as to the ordinal numbers assigned to recited display panels; it is to be understood that this may result in the "first display panel" recited in a claim actually referring to what is described in the specification as a "second display panel."

It will also be recognized that usage of displays having movable display units as discussed herein may not be limited to just the main/primary game display of an electronic gaming machine. Such displays with movable display units (both with and without a fixed display frame) may be used in displays used to depict a secondary or bonus game, as well as in a topper display or other signage relating to the electronic gaming machine, such as a bank display typically positioned above and displaying video content common to a bank of two or more gaming machines. In some implementations, some or all main, secondary, topper, and bank dynamic displays common to a bank of gaming machines may operate in a coordinated manner, e.g. presenting a coordinated wave type movement across the gaming machine and bank displays.

As is evident from the above discussion, control software and/or hardware may be provided to control the display panels and the various actuators. For example, a memory of a gaming controller (or other computing device) may store computer-executable instructions for controlling the various displays and or actuators to display particular content, e.g., game-related content such as reel stops, outcomes, wild indicators, credit information, etc., and to coordinate the movement of the movable display units in a manner that complements the graphical content that is displayed.

For example, a gaming controller or other computing device may be configured to receive data indicative of graphical content that is to be displayed on the display panels of a dynamic display (the display panels of the movable display units and, if present, the display panel(s) of the fixed display frame). The gaming controller or other computing device may also be configured to receive data that is indicative of displacements of the movable display units relative to some reference point. Such data may, for example, be similar to a bump map or other arrayed data that indicates relative intensity values of distinct pixels, except that in this case, the "intensity" value would map to the absolute displacement of the movable display unit from a frame of reference and each pixel would correspond to a single movable display unit (which may have a second display panel with a single pixel but which may, in many implementations, have a second display panel with multiple pixels.

Such computer software may be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the computer software can be executed by different devices, for example in a client server relationship. Persons skilled in the art, will appreciate that computer software provides a series of instructions executable by the processor.

It is to be understood that the phrase "for each <item> of the one or more <items>," if used herein, should be understood to be inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

Terms such as "about," "approximately," "substantially," "nominal," or the like, when used in reference to quantities or similar quantifiable properties, are to be understood to be inclusive of values within ±10% of the values or relationship specified (as well as inclusive of the actual values or relationship specified), unless otherwise indicated.

The disclosure is not limited to the specific implementations described herein, but rather, components of the systems and/or articles and/or steps of the methods may be utilized independently and separately from other components and/or steps described herein. For example, the configuration of components described herein may also be used in combination with other processes, and is not limited to practice with the systems, articles, and related methods as described herein. Rather, the example implementation can be implemented and utilized in connection with many applications in which a game or bonus game is desired.

Although specific features of various implementations of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the implementations of the present disclosure, including the best mode, and also to enable any person skilled in the art to practice the disclosure, including making and using any devices or systems and performing any incorporated methods. The patentable scope of the implementations described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

a housing;

a plurality of movable illuminable panels arranged in a rectangular array;

a plurality of linear drive mechanisms, each linear drive mechanism connected with one of the movable illuminable panels and configured to translate the movable illuminable panel connected therewith relative to the housing and along a corresponding first axis responsive to receipt of a control signal; and a game controller that includes one or more processors and one or more memory devices, wherein:

the first axes are parallel to one another, the one or more processors and the one or more memory devices are operably connected, and the one or more memory devices store computer-executable instructions for controlling the one or more processors to:

present a wagering game using one or more displays, and cause the linear drive mechanisms to be selectively actuated to cause the movable illuminable panels connected therewith to translate along the first axes responsive to receipt of one or more control signals.

2. The electronic gaming system of claim 1, wherein:

there are only 3 or 2 movable illuminable panels in a first direction of the rectangular array and only 2, 3, 4, or 5 movable illuminable panels in a second direction of the rectangular array perpendicular to the first direction.

3. The electronic gaming system of claim 1, wherein the rectangular array is a non-square array.

4. The electronic gaming system of claim 1, wherein the linear drive mechanisms are electrically operated.

5. The electronic gaming system of claim 4, wherein the linear drive mechanisms are solenoids.

6. The electronic gaming system of claim 1, wherein each illuminable panel is configured to, when emitting light, emit the light in at least directions parallel to the first directions.

7. The electronic gaming system of claim 1, wherein the illuminable panels are liquid crystal display panels.

8. Non-transitory computer-readable media storing instructions which, when executed by one or more processors, cause the one or processors to:

cause a wagering game to be presented on one or more displays of an electronic gaming system;

cause one or more linear drive mechanisms of a plurality of linear drive mechanisms of the electronic gaming machine to be selectively actuated so as to cause movable illuminable panels connected therewith to translate along corresponding first axes responsive to receipt of one or more control signals, wherein the plurality of movable illuminable panels is arranged in a rectangular array and the first axes are parallel to one another.

9. The non-transitory computer-readable media of claim 8, wherein there are only 3 or 2 movable illuminable panels in a first direction of the rectangular array and only 2, 3, 4, or 5 movable illuminable panels in a second direction of the rectangular array perpendicular to the first direction.

10. The non-transitory computer-readable media of claim 8, wherein the rectangular array is a non-square array.

11. The non-transitory computer-readable media of claim 8, wherein the linear drive mechanisms are electrically operated.

12. The non-transitory computer-readable media of claim 8, wherein the linear drive mechanisms are solenoids.

13. The non-transitory computer-readable media of claim 8, wherein each illuminable panel is configured to, when emitting light, emit the light in at least directions parallel to the first directions.

14. The non-transitory computer-readable media of claim 8, wherein the illuminable panels are liquid crystal display panels.

15. A method comprising:

causing one or more linear drive mechanisms of a plurality of linear drive mechanisms of an electronic gaming machine to be selectively actuated so as to cause movable illuminable panels connected therewith to translate along corresponding first axes responsive to receipt of one or more control signals, wherein the plurality of movable illuminable panels is arranged in a rectangular array and the first axes are parallel to one another.

16. The method of claim 15, wherein there are only 3 or 2 movable illuminable panels in a first direction of the rectangular array and only 2, 3, 4, or 5 movable illuminable panels in a second direction of the rectangular array perpendicular to the first direction.

17. The method of claim 15, wherein the rectangular array is a non-square array.

18. The method of claim 15, wherein the linear drive mechanisms are electrically operated.

19. The method of claim 15, wherein the linear drive mechanisms are solenoids.

20. The method of claim 15, wherein each illuminable panel is configured to, when emitting light, emit the light in at least directions parallel to the first directions.

* * * * *